(12) United States Patent
Hill

(10) Patent No.: US 7,023,560 B2
(45) Date of Patent: Apr. 4, 2006

(54) METHOD AND APPARATUS FOR DARK FIELD INTERFEROMETRIC CONFOCAL MICROSCOPY

(75) Inventor: Henry Allen Hill, Tucson, AZ (US)

(73) Assignee: Zetetic Institute, Tuscon, AZ (US)

( * ) Notice: Subject to any disclaimer, the term of this patent is extended or adjusted under 35 U.S.C. 154(b) by 0 days.

(21) Appl. No.: 10/782,058

(22) Filed: Feb. 19, 2004

(65) Prior Publication Data

US 2004/0201855 A1 Oct. 14, 2004

Related U.S. Application Data

(60) Provisional application No. 60/448,360, filed on Feb. 19, 2003, provisional application No. 60/448,250, filed on Feb. 19, 2003.

(51) Int. Cl.
*G01B 9/02* (2006.01)

(52) U.S. Cl. .................................. 356/511

(58) Field of Classification Search ............. 356/450, 356/511, 512, 521, 489, 495
See application file for complete search history.

(56) References Cited

U.S. PATENT DOCUMENTS

| | | |
|---|---|---|
| 3,628,027 A | 12/1971 | Brauss |
| 3,748,015 A | 7/1973 | Offner |
| 4,011,011 A | 3/1977 | Hemstreet et al. |
| 4,226,501 A | 10/1980 | Shafer |
| 4,272,684 A | 6/1981 | Seachman |
| 4,685,803 A | 8/1987 | Sommargren |

(Continued)

OTHER PUBLICATIONS

U.S. Appl. No. 09/852,369, filed Jan. 3, 2002, Hill.

(Continued)

*Primary Examiner*—Gregory J. Toatley, Jr.
*Assistant Examiner*—Patrick Connolly
(74) *Attorney, Agent, or Firm*—Wilmer Cutler Pickering Hale and Dorr LLP

(57) ABSTRACT

A differential interferometric confocal microscope for measuring an object, the microscope including: a source-side pinhole array; a detector-side pinhole array; and an interferometer that images the array of pinholes of the source-side pinhole array onto a first array of spots located in front of an object plane located near where the object is positioned and onto a second array of spots behind the object plane, wherein the first and second arrays of spots are displaced relative to each other in a direction that is normal to the object plane, the interferometer also (1) imaging the first arrays of spots onto a first image plane that is behind the detector-side pinhole array, (2) imaging the first array of spots onto a plane defined by the detector-side pinhole array, (3) imaging the second array of spots onto a second image plane that is in front of the detector-side pinhole array, and (4) imaging the second array of spots onto the plane defined by the detector-side pinhole array, wherein each spot of the imaged first array of spots in the first image plane is aligned with a corresponding different spot of the imaged second array of spots in the second image plane and a corresponding different pinhole of the detector-side pinhole array, and wherein each spot of the imaged first array of spots in the plane defined by the detector-side array coincides with a corresponding different spot of the imaged second array of spots in the plane defined by the detector-side array and coincides with a corresponding different pinhole of the detector-side pinhole array.

20 Claims, 9 Drawing Sheets

U.S. PATENT DOCUMENTS

| | | | |
|---|---|---|---|
| 4,733,967 A | 3/1988 | Sommargren | |
| 5,220,403 A | 6/1993 | Batchelder | |
| 5,241,423 A | 8/1993 | Chiu et al. | |
| 5,327,223 A * | 7/1994 | Korth | 356/511 |
| 5,485,317 A | 1/1996 | Perissinotto | |
| 5,602,643 A | 2/1997 | Barrett | |
| 5,614,763 A | 3/1997 | Womack | |
| 5,633,972 A | 5/1997 | Walt | |
| 5,659,420 A * | 8/1997 | Wakai et al. | 356/511 |
| 5,699,201 A | 12/1997 | Lee | |
| 5,757,493 A | 5/1998 | VanKerkhove | |
| 5,760,901 A | 6/1998 | Hill | |
| 5,828,455 A * | 10/1998 | Smith et al. | 356/521 |
| 5,894,195 A | 4/1999 | McDermott | |
| 5,915,048 A | 6/1999 | Hill et al. | |
| 6,011,654 A | 1/2000 | Schweizer et al. | |
| 6,052,231 A | 4/2000 | Rosenbluth | |
| 6,091,496 A | 7/2000 | Hill | |
| 6,124,931 A | 9/2000 | Hill | |
| 6,271,923 B1 | 8/2001 | Hill | |
| 6,330,065 B1 | 12/2001 | Hill | |
| 6,445,453 B1 * | 9/2002 | Hill | 356/450 |
| 6,447,122 B1 | 9/2002 | Kobayashi et al. | |
| 6,480,285 B1 | 11/2002 | Hill | |
| 6,552,805 B1 * | 4/2003 | Hill | 356/511 |
| 6,552,852 B1 | 4/2003 | Hill | |
| 6,597,721 B1 | 7/2003 | Hutchinson et al. | |
| 6,606,159 B1 * | 8/2003 | Hill | 356/491 |
| 6,667,809 B1 * | 12/2003 | Hill | 356/511 |
| 6,714,349 B1 | 3/2004 | Nam | |
| 6,717,736 B1 | 4/2004 | Hill | |
| 6,753,968 B1 * | 6/2004 | Hill | 356/491 |
| 6,775,009 B1 * | 8/2004 | Hill | 356/516 |
| 6,847,029 B1 | 1/2005 | Hill | |
| 6,847,452 B1 | 1/2005 | Hill | |
| 2002/0021451 A1 * | 2/2002 | Hill | 356/511 |
| 2002/0033952 A1 * | 3/2002 | Hill | 356/512 |
| 2002/0074493 A1 | 6/2002 | Hill | |
| 2002/0131179 A1 | 9/2002 | Hill | |
| 2003/0147083 A1 * | 8/2003 | Hill | 356/491 |
| 2003/0174992 A1 | 9/2003 | Levene | |
| 2004/0201852 A1 * | 10/2004 | Hill | 356/511 |
| 2004/0201853 A1 * | 10/2004 | Hill | 356/511 |
| 2004/0201854 A1 | 10/2004 | Hill | |
| 2004/0201855 A1 * | 10/2004 | Hill | 356/511 |
| 2004/0202426 A1 | 10/2004 | Hill | |
| 2004/0227950 A1 * | 11/2004 | Hill | 356/511 |
| 2004/0227951 A1 * | 11/2004 | Hill | 356/511 |
| 2004/0228008 A1 | 11/2004 | Hill | |
| 2004/0246486 A1 | 12/2004 | Hill | |
| 2004/0257577 A1 | 12/2004 | Hill | |
| 2005/0036149 A1 | 2/2005 | Hill | |

OTHER PUBLICATIONS

U.S. Appl. No. 09/917,402, filed Jul. 27, 2001, Hill.
U.S. Appl. No. 10/765,254, filed Jan. 27, 2004, Hill.
U.S. Appl. No. 10/765,368, filed Jan. 27, 2004, Hill.
U.S. Appl. No. 10/886,157, filed Jul. 7, 2004, Hill.
U.S. Appl. No. 60/442,858, filed 07/27/2002, Hill.
U.S. Appl. No. 60/442,982, filed Jan. 29, 2003, Hill.
U.S. Appl. No. 60/443,980, filed Jan. 31, 2003, Hill.
U.S. Appl. No. 60/444,707, filed Jan. 4, 2003, Hill.
U.S. Appl. No. 60/445,739, filed Feb. 7, 2003, Hill.
U.S. Appl. No. 60/447,254, filed Feb. 13, 2003, Hill.
U.S. Appl. No. 60/448,250, filed Jan. 19, 2003, Hill.
U.S. Appl. No. 60/448,360, filed Feb. 19, 2003, Hill.
U.S. Appl. No. 60/459,425, filed Apr. 11, 2003, Hill.
U.S. Appl. No. 60/459,493, filed Apr. 1, 2003, Hill.
U.S. Appl. No. 60/460,129, filed Apr. 3, 2003, Hill.
U.S. Appl. No. 60/485,255, filed Jul. 7, 2003, Hill.
U.S. Appl. No. 60/485,507, filed Jul. 7, 2003, Hill.
U.S. Appl. No. 60/501,666, filed Sep. 10, 2003, Hill.
U.S. Appl. No. 60/506,715, filed Sep. 26, 2003, Hill.

* cited by examiner

# METHOD AND APPARATUS FOR DARK FIELD INTERFEROMETRIC CONFOCAL MICROSCOPY

This claims the benefit of U.S. Provisional Application No. 60/448,250, filed Feb. 19, 2003 and U.S. Provisional Application No. 60/448,360, filed Feb. 19, 2003.

TECHNICAL FIELD

This invention relates to interferometric confocal microscopy.

BACKGROUND OF THE INVENTION

There are number of different forms of differential confocal microscopy. In one differential form, the Nomarski microscope measures one component of a conjugated quadratures of fields corresponding to the electrical interference signal of two images superimposed in an image plane. In another differential form, the conjugated quadratures of a dark field are measured one point at a time. In another differential form, the conjugated quadratures of each of two fields corresponding to two images superimposed in an image plane are measured one point at a time. In commonly owned U.S. Provisional Patent Application No. 60/447,254 (ZI-40) entitled "Transverse Differential Interferometric Confocal Microscopy" and U.S. patent application Ser. No. 10/778,371, filed Feb. 13, 2004 (ZI-40) also entitled "Transverse Differential Interferometric Confocal Microscopy" both of which are by Henry A. Hill, it is taught how to practice transverse differential interferometric confocal microscopy. In commonly owned U.S. Provisional Patent Application No. 60/448,360 (ZI-41) entitled "Longitudinal Differential Interferometric Confocal Microscopy" and U.S. patent application Ser. No. 10/782,057, filed Feb. 19, 2004 (ZI-41) also entitled "Longitudinal Differential Interferometric Confocal Microscopy" both of which are by Henry A. Hill, it is taught how to practice longitudinal differential interferometric confocal microscopy. The contents of both the cited U.S. Provisional Applications and the cited U.S. Patent Applications are herein incorporated in their entirety by reference.

However, neither the prior art nor the two cited U.S. provisional patent applications or the two cited U.S. Patent Applications teach how to practice differential interferometric confocal microscopy wherein an array of conjugated quadratures of fields are measured jointly, where the components of each conjugated quadratures may be measured jointly, and where each conjugated quadratures represent a difference of conjugated quadratures of fields of converging beams subsequently scattered/reflected or transmitted by a common location on a substrate surface wherein one of the converging beams subsequently scattered/reflected from the location is focused to an image plane located above the substrate surface and the second of the converging beams subsequently scattered/reflected from the location is focused to an image plane located below the substrate surface.

Also, prior art does not teach how to practice dark field differential interferometric confocal microscopy wherein an array of conjugated quadratures of fields are measured jointly, where the components of each conjugated quadratures may be measured jointly, where each conjugated quadratures represents a difference of conjugated quadratures of fields of converging beams subsequently scattered/reflected from a common location on a substrate surface wherein one of the converging beams subsequently scattered/reflected or transmitted by the location is focused to an image plane located above the substrate surface and the second of the converging beams subsequently scattered/reflected or transmitted by the location is focused to an image plane located below the substrate surface, and where the nominal values of the conjugated quadratures of the array of conjugated quadratures is zero, i.e., the field that is being measured is nominally dark.

SUMMARY OF THE INVENTION

Embodiments of the present invention comprise interferometric confocal microscopy systems wherein an array of conjugated quadratures of fields are measured jointly, where the components of each conjugated quadratures may be measured jointly, where each conjugated quadratures represents a difference of conjugated quadratures of fields of converging beams subsequently scattered/reflected or transmitted by a common location on a substrate surface wherein one of the converging beams subsequently scattered/reflected from the location is focused to an image plane located above the substrate surface and the second of the converging beams subsequently scattered/reflected or transmitted by the location is focused to an image plane located below the substrate surface, and where the nominal values of the conjugated quadratures of the array of conjugated quadratures may be adjusted as a set to be zero by controlling a single system parameter. The embodiments further comprise embodiments configured for operation in a dark field mode.

The embodiments of the present invention configured for operation in a dark field mode can be used to measure properties of a thin film on the surface of a substrate with a lateral spatial resolution approximately the same as the lateral spatial resolution of an associated interferometric confocal imaging system.

The reflection/scattering properties of a substrate may also be measured for different reflection/scattering or transmission polarization states of a measurement beam in embodiments of the present invention.

In general, in one aspect, the invention features a differential interferometric confocal microscope for measuring an object. The microscope includes: a source-side pinhole array; a detector-side pinhole array; and an interferometer that images the array of pinholes of the source-side pinhole array onto a first array of spots located in front of an object plane located near where the object is positioned and onto a second array of spots behind the object plane, wherein the first and second arrays of spots are displaced relative to each other in a direction that is normal to the object plane, said interferometer also (1) imaging the first arrays of spots onto a first image plane that is behind the detector-side pinhole array, (2) imaging the first array of spots onto a second image plane, (3) imaging the second array of spots onto the second image plane, and (4) imaging the second array of spots onto a third image plane that is in front of the plane defined by the detector-side pinhole array, wherein each spot of the imaged first array of spots in the first image plane is aligned with a corresponding different spot of the imaged second array of spots in the second image plane and a corresponding different pinhole of the detector-side pinhole array, and wherein each spot of the imaged first array of spots in the second image plane coincides with a corresponding different spot of the imaged second array of spots in the second image plane and is aligned with a corresponding different pinhole of the detector-side pinhole array.

In general, in another aspect, the invention features a differential interferometric confocal microscope for measuring an object and which includes: a source-side pinhole array for producing an array of input beams; and a detector-side pinhole array; and an interferometer including: a first optical element providing a first reflecting surface; a second optical element providing a second reflecting surface; and a beam splitter positioned between the first and second optical elements, wherein the beam splitter produces from the array of input beams a first array of measurement beams and a second array of measurement beams, wherein the first reflecting surface participates in focusing the first array of measurement beams onto a first array of locations on a first object plane in object space and the second reflecting surface participates in focusing the second array of measurement beams onto a second array of locations on a second object plane in object space, said first and second object planes being parallel to and displaced from each other, wherein the first array of measurement beams generates a first array of return beams from the object and the second array of measurement beams generates a second array of return beams from the object, wherein the first and second reflecting elements participate in producing from the first array of return beams (1) a first array of converging beams that converge to a first array of spots on a first image plane and (2) a second array of converging beams that converge onto a second array of spots on a second image plane, wherein the first and second reflecting elements participate in producing from the second array of return beams (1) a third array of converging beams that converge onto the second array of spots on the second image plane and (2) a fourth array of converging beams that converge onto a third array of spots on a third image plane, wherein said first and third image planes are adjacent to and on opposite sides of the detector-side pinhole array, and the second image plane lies between the first and third image planes, and wherein the detector-side pinhole array combines the first, second, third, and fourth arrays of converging beams to form an array of output beams.

Other embodiments include one ore more of the following features. A single pinhole array serves as both the source-side pinhole array and the detector-side pinhole array. The first optical element is located between said single pinhole array and the beam splitter and wherein the second optical element is located between a location at which the object is positioned during use and the beam splitter, wherein the first reflecting surface has a center of curvature for which there is a corresponding conjugate as viewed through the beam splitter, and wherein the second reflecting surface has a center of curvature that is displaced relative to the corresponding conjugate of the center of curvature of the first reflecting surface. The conjugate of the center of curvature of the first reflecting surface and the center of curvature of the second reflecting surface are displaced from each other in a direction that is normal to a plane defined by the beam splitter. The first reflecting surface participates in focusing the first array of measurement beams via the beam splitter onto the first array of locations and the second reflecting surface participates in focusing the second array of measurement beams via the beam splitter onto the second array of locations. The first reflecting surface is substantially concentric with a point on the object. The second optical element provides a refracting surface positioned between the object and the beam splitter to receive light rays from the object. The first reflecting surface substantially conforms to a sphere having a first radius and the refracting surface conforms to a sphere having a second radius, wherein the first radius is greater than the second radius. The first optical element provides a refracting surface positioned between the beam splitter and said single pinhole array. The second reflecting surface is substantially concentric with an image point on said single pinhole array. The second reflecting surface substantially conforms to a sphere having a first radius and the refracting surface conforms to a sphere having a second radius, wherein the first radius is greater than the second radius. The said single pinhole array is a two-dimensional array. The two-dimensional array is of equally-spaced holes. The equally-spaced holes are circular apertures.

An advantage of at least one embodiment of the present invention is that the fields of beams scattered/reflected or transmitted by a pair of locations on a substrate surface are generated by a single confocal pinhole.

Another advantage of at least one embodiment of the present invention is that reference beam components of an array of reference beams used in generation of electrical interference signals corresponding to measured conjugated quadratures of fields of a pair of converging beams scattered/reflected or transmitted by a common spot on a substrate are identical.

Another advantage of at least one embodiment of the present invention is that components of background beams generated by measurement beam components subsequently scattered/reflected or transmitted at a common spot on a substrate surface are substantially identical at a confocal pinhole.

Another advantage of at least one embodiment of the present invention is that the spatial filtering of fields of a pair of converging beams scattered/reflected or transmitted at a common spot on a substrate surface is performed by a single confocal pinhole.

Another advantage of at least one embodiment of the present invention is that information about a substrate surface is obtained with an interferometric confocal imaging system operating in a dark field mode.

Another advantage of at least one embodiment of the present invention is that information about a substrate surface is obtained with reduced systematic and statistical errors.

Another advantage of at least one embodiment of the present invention is the generation of a significant increase in throughput because the intensity of an input beam may be significantly increased without saturation of a detector system.

Another advantage of at least one embodiment of the present invention is that an array of conjugated quadratures of the fields of arrays of pairs of converging beams scattered/reflected or transmitted by an array of common spots on a substrate surface is measured jointly and the components of each conjugated quadratures may be measured jointly.

Another advantage of at least one embodiment of the present invention is that an array of conjugated quadratures of the fields of arrays of pairs of converging beams scattered/reflected or transmitted by an array of common spots on a substrate surface may be measured using different reflection/scattering or transmission polarization states of a measurement beam.

Another advantage of at least one embodiment of the present invention is that information is obtained about critical dimensions and locations of sub-wavelength artifacts on a substrate surface.

Another advantage of at least one embodiment of the present invention is that information is obtained about the sizes and locations of sub-wavelength defects on a substrate surface.

Another advantage of at least one embodiment of the present invention is that information may be obtained about one-dimensional and two-dimensional profiles of a substrate surface.

Another advantage of at least one embodiment of the present invention is that imaging of a substrate surface profile with a lateral resolution of the order of 100 nm and a longitudinal resolution of the order of 200 nm may be obtained with a working distance of the order of a mm.

DETAILED DESCRIPTION

Figure 1A:
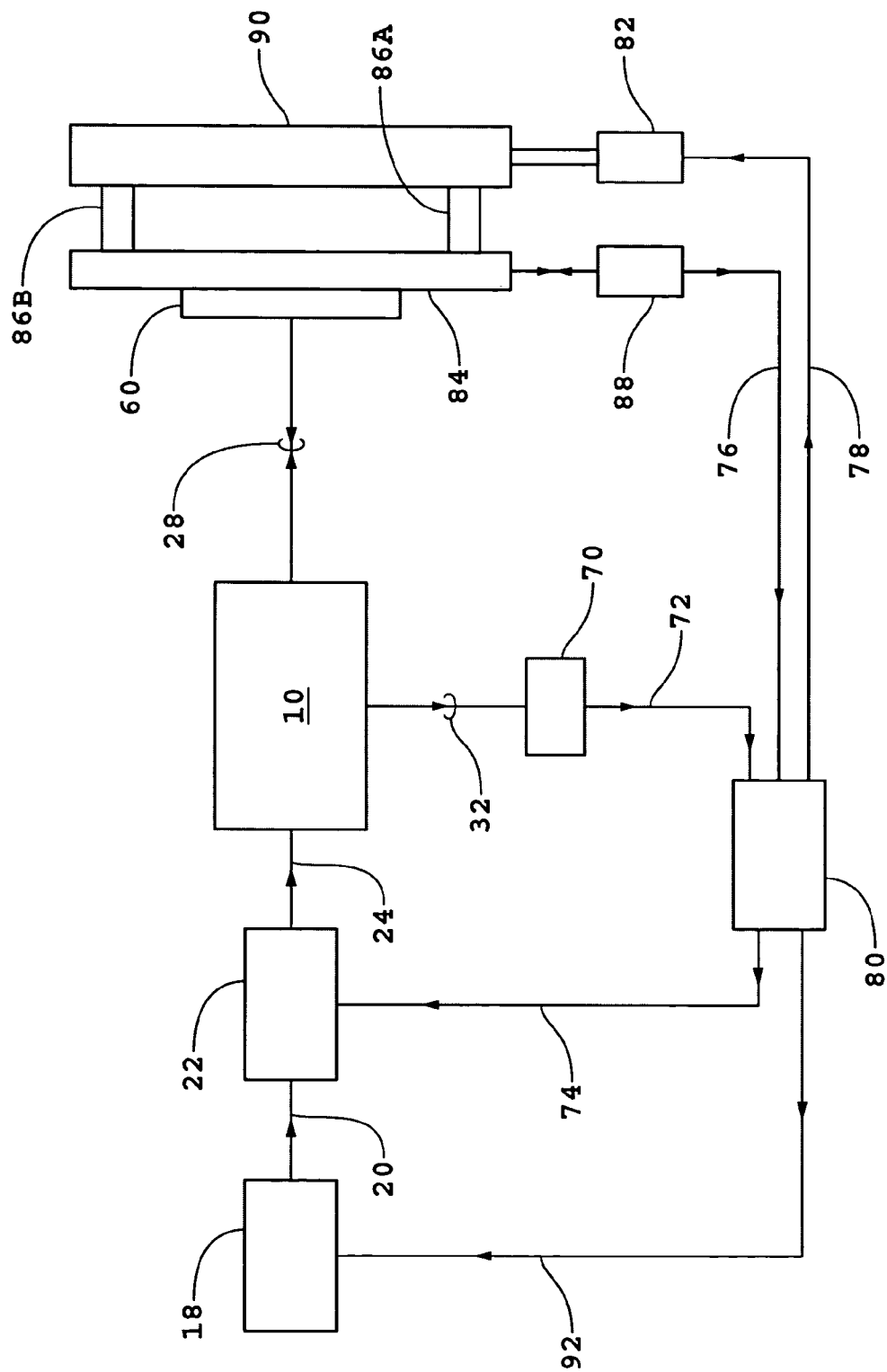
FIG. 1a is a diagram of an interferometric system used to make differential measurements of conjugated quadratures of fields of beams scattered/reflected or transmitted by a substrate.

An array of conjugated quadratures of fields is measured interferometrically by a confocal interferometer and detector system wherein each conjugated quadratures corresponds to a difference of conjugated quadratures of fields of a pair of converging beams scattered/reflected or transmitted by a common spot on/in a substrate. The array of conjugated quadratures measured jointly, i.e., simultaneously. In addition, the components of each conjugated quadratures may be measured jointly. The converging beams subsequently converge as focused beams to spots located above and below the common spot. The relative phases of the pair of converging beams may be adjusted so that the differences of the complex amplitudes of the fields of the pair of converging beams scattered/reflected or transmitted by the common spot are nominally zero, i.e., information may be obtained about the substrate with the interferometer and detector system operating in a dark field mode and using if required different reflection/scattering polarization states of a measurement beam. Operation in a dark field mode leads to both reduced systematic and statistical errors in the information. The information may comprise the profile of one or more surfaces of a substrate and the thickness profile of a thin film layer on/in a substrate as well as information about critical dimensions of features on a substrate and the size and location of sub-wavelength defects.

In one embodiment, an image plane of an interferometric confocal imaging system comprises a superposition of two images of a substrate surface wherein each of the two superimposed images corresponds to a partially defocused image of a common location on the substrate surface. The two partially defocused images correspond to conjugate spots that are displaced longitudinally relative to each other at the substrate surface. An array of conjugated quadratures of fields representing the superimposed images are measured jointly and the components of each conjugated quadratures may be measured jointly. The longitudinal separation of the image planes of the beams generating the partially defocused images of the substrate surface is of the order of the longitudinal resolution of the interferometric confocal imaging system. The respective conjugated quadrature of the a is a $\sin \phi$ when the quadrature $x(\phi)$ of the field is a $\cos \phi$.

In another embodiment, the relative phases of two converging beams subsequently scattered/reflected or transmitted at a common location on a substrate surface may be adjusted by confocal imaging system parameters so that conjugated quadratures of an array of conjugated quadratures of fields of the converging beams scattered/reflected or transmitted by the common location are nominally zero, i.e., information is obtained about the substrate surface with the interferometric imaging system operating in a dark field mode. Different reflection/scattering or transmission polarization states of a measurement beam may also be used.

A general description of embodiments incorporating various aspects of the present invention will first be given wherein the embodiments comprise an interferometer system that uses either a single-, double, bi-, or quad-homodyne detection and a first array of partially defocused images of an array of a set of locations on a substrate surface and a second array of partially defocused images of an array of the same set of locations on the substrate surface are superimposed on an image plane of the interferometer system. The longitudinal separation of the image planes of the beams generating the partially defocused images of the substrate surface is of the order of the longitudinal resolution of the interferometer system. There is a one-to-one mapping of a location in the superimposed image space to a common location on the surface of the substrate.

Referring to FIG. 1a, an interferometer system is shown diagrammatically comprising an interferometer generally shown as numeral 10, a source 18, beam-conditioner 22, detector 70, an electronic processor and controller 80, and a measurement object or substrate 60. Source 18 and beam conditioner 22 generate input beam 24 comprising one or more frequency components. Source 18 is a pulsed source. Two or more of the frequency components of input beam 24 may be coextensive in space and may have the same temporal window function.

Reference and measurement beams are generated in interferometer 10 for each of the frequency components of beam 24. The measurement beam generated in interferometer 10 is one component of beam 28 and imaged to form an array of pairs of partially defocused images on the surface of substrate 60. Beam 28 further comprises a return reflected/scattered measurement beam that is generated by the reflection/scattering or transmission of the measurement beam component of beam 28 at the array of pairs of partially defocused images on the surface of substrate 60. Interferometer 10 superimposes the two arrays of components of the return measurement beam corresponding to the two arrays components of beam 28 reflected/scattered or transmitted at the arrays of the pairs of defocused images to form a single array of superimposed images of return measurement beam components of beam 28. The return measurement beam components of beam 28 are subsequently combined with the reference beam in interferometer 10 to form output beam 32.

Output beam 32 is detected by detector 70 to generate an electrical interference signal 72. Detector 70 may comprise an analyzer to select common polarization states of the reference and return measurement beam components of beam 32 to form a mixed beam. Alternatively, interferometer 10 may comprise an analyzer to select common polarization states of the reference and return measurement beam components such that beam 32 is a mixed beam.

Two different modes are described for the acquisition of the electrical interference signals 72. The first mode to be described is a step and stare mode wherein substrate 60 is stepped between fixed locations corresponding to locations where image information is desired. The second mode is a scanning mode. In the step and stare mode for generating a one-dimensional and a two-dimensional surface profile of substrate 60, substrate 60 mounted in wafer chuck 84/stage 90 is translated by stage 90. The position of stage 90 is controlled by transducer 82 according to servo control signal 78 from electronic processor and controller 80. The position of stage 90 is measured by metrology system 88 and position information acquired by metrology system 88 is transmitted to electronic processor and controller 80 to generate an error signal for use in the position control of stage 90. Metrology system 88 may comprise for example linear displacement and angular displacement interferometers and cap gauges.

Electronic processor and controller 80 directs the translation of wafer stage 90 to a desired position and then acquires a set of four electrical interference signal values. After the acquisition of the sequence of four electrical interference signals, electronic processor and controller 80 then repeats the procedure for the next desired position of stage 90. The elevation and angular orientation of substrate 60 is controlled by transducers 86A and 86B.

The second mode for the acquisition of the electrical interference signal values is next described wherein the electrical interference signal values are obtained with the position of stage 90 scanned in one or more directions. In the scanning mode, source 18 is pulsed at times controlled by signal 92 from signal processor and controller 80. Source 18 is pulsed at times corresponding to the registration of the conjugate image of confocal pinholes or pixels of detector 70 with positions on and/or in substrate 60 for which image information is desired.

There will be a restriction on the duration or "pulse width" of a beam pulse $\tau_{p1}$ produced by source 18 as a result of the continuous scanning mode used in the third variant of the first embodiment. Pulse width $\tau_{p1}$ will be a parameter that in part controls the limiting value for spatial resolution in the direction of a scan to a lower bound of $$\tau_{p1} V, \quad (1)$$

where V is the scan speed. For example, with a value of $\tau_{p1}$=50 nsec and a scan speed of V=0.20 m/sec, the limiting value of the spatial resolution $\tau_{p1}V$ in the direction of scan will be $$\tau_{p1}V=10 \text{ nm}. \quad (2)$$

Pulse width $\tau_{p1}$ will also determine the minimum frequency difference that can be used in the bi- and quad-homodyne detection methods. In order that there be no contributions to the electrical interference signals from interference between fields of conjugated quadratures, the minimum frequency spacing $\Delta f_{min}$ is expressed as $$\Delta f_{min} \gg \frac{1}{\tau_{pl}}. \quad (3)$$

For an example of $\tau_{p1}$=50 nsec, $1/\tau_{p1}$=20 MHz.

For certain embodiments, the frequencies of input beam 24 are controlled by signals 74 and/or 92 from signal processor and controller 80 to correspond to the frequencies that will yield the desired phase shifts between the reference and return measurement beam components of output beam 32. Alternatively in certain other embodiments, the relative phases of reference and measurement beam components of input beam 24 are controlled by signal 74 and/or 92 from signal processor and controller 80 to correspond to the desired phase shifts between the reference and return measurement beam components of output beam 32. In the first mode, i.e., the step and stare mode, each set of the sets of arrays of four electrical interference signal values corresponding to the set of four phase shift values are generated by a single pixel of detector 70 for single- and bi-homodyne detection method, by two pixels of detector 70 for the quad-homodyne detection method, and by four pixels of detector 70 for the double-homodyne detection methods. In the second mode for the acquisition of the electrical interference signal values, each corresponding set of four electrical interference signal values are generated by a conjugate set of four different pixels of detector 70 for each of the four homodyne detection methods. Thus in the first mode of acquisition, the differences in pixel efficiency are compensated in the signal processing by signal processor and controller 80 for the double-, bi-, and quad-homodyne detection methods and in the second mode of acquisition, the differences in pixel efficiency and the differences in sizes of pinholes in confocal pinhole arrays are compensated in the signal processing by signal processor and controller 80 as described in the subsequent description of the homodyne detection methods. The joint measurements of conjugated quadratures of fields generated by electric processor and controller 80 are subsequently described in the description of the bi- and quad homodyne detection methods.

In practice, known phase shifts are introduced between the reference and measurement beam components of output beam 32 by two different techniques. In one technique, phase shifts are introduced between the reference and measurement beam components for each of the at least two frequency components by source 18 and beam-conditioner 22 as controlled by signals 92 and 74, respectively, from electronic processor and controller 80. In the second technique, phase shifts are introduced between the reference and measurement beam components for each of the frequency components as a consequence of frequency shifts introduced to the frequency components of input beam 24 by source 18 and beam-conditioner 22 as controlled by signals 92 and 74, respectively, from electronic processor and controller 80.

Figure 1B:
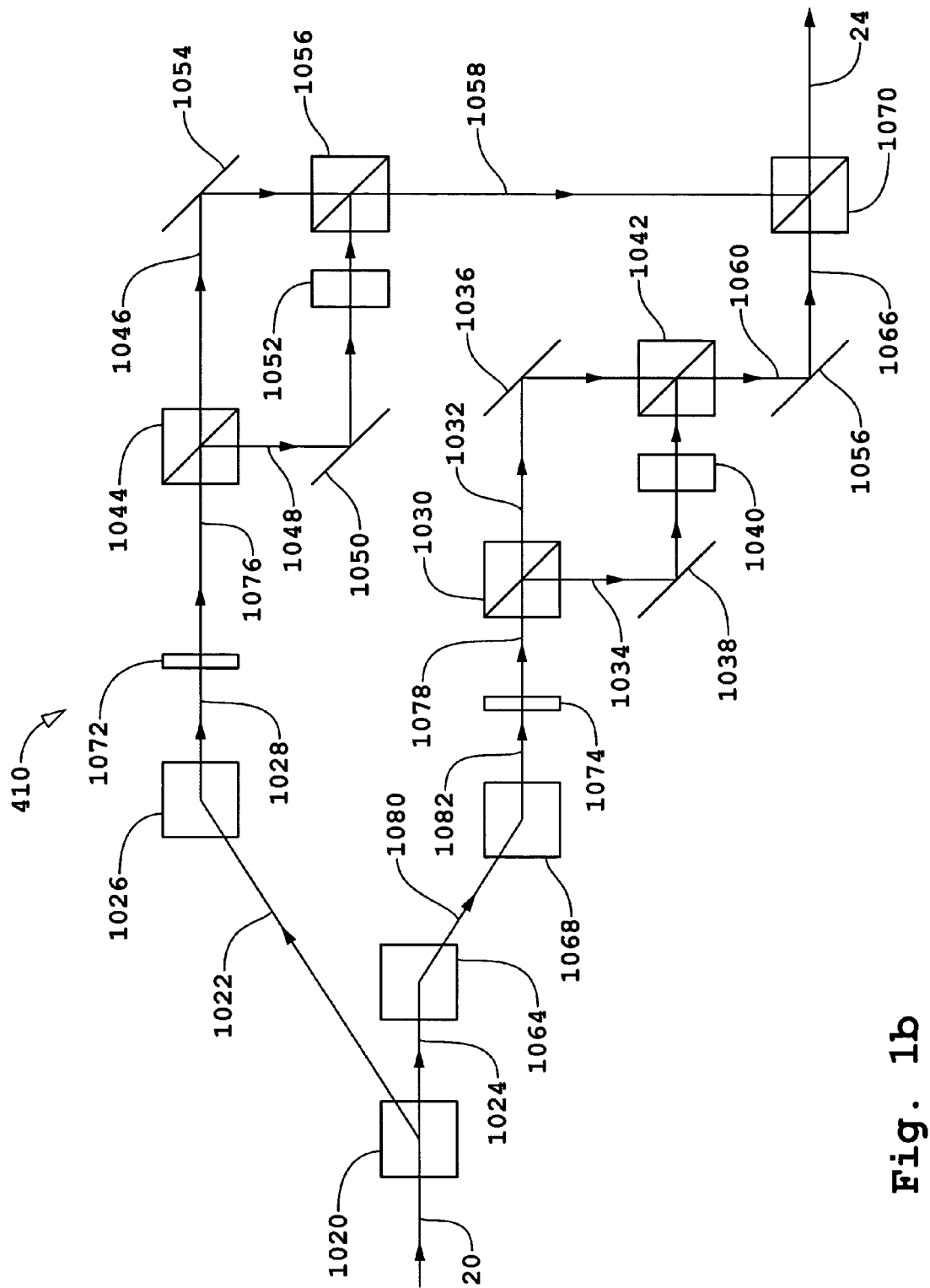
FIG. 1b is a schematic diagram of a beam-conditioner configured to operate in a two-frequency generator and phase-shifter.

There are different ways to configure source 18 and beam-conditioner 22 to meet the input beam requirements of different embodiments. Reference is made to FIG. 1b where beam-conditioner 22 is configured as a two-frequency generator and a phase-shifter and source 18 is configured to generate beam 20 with one frequency component. The two-frequency generator and phase-shifter configuration comprises acousto-optic modulators 1020, 1026, 1064, and 1068; polarizing beam-splitters 1030, 1042, 1044, and 1056;

phase-shifters 1040 and 1052; half wave phase retardation plates 1072 and 1074; non-polarizing beam-splitter 1070, and mirrors 1036, 1038, 1050, 1054, and 1056.

Input beam 20 is incident on acousto-optic modulator 1020 with a plane of polarization parallel to the plane of FIG. 1b. A first portion of beam 20 is diffracted by acousto-optic modulator 1020 as beam 1022 and then by acousto-optic modulator 1026 as beam 1028 having a polarization parallel to the plane of FIG. 1b. A second portion of beam 20 is transmitted as a non-diffracted beam 1024 having a plane of polarization parallel to the plane of FIG. 1b. The acoustic power to acousto-optic modulator 1020 is adjusted such that beams 1022 and 1024 have nominally the same intensity.

Acousto-optic modulators 1020 and 1026 may be of either the non-isotropic Bragg diffraction type or of the isotropic Bragg diffraction type. The frequency shifts introduced by acousto-optic modulators 1020 and 1026 are of the same sign and equal to ¼ of the desired frequency shift between the two frequency components of input beam 24. Also the direction of propagation of beam 1028 is parallel to the direction of propagation of beam 1024.

Beam 1024 is diffracted by acousto-optic modulators 1064 and 1068 as beam 1082 having a polarization parallel to the plane of FIG. 1b. Acousto-optic modulators 1064 and 1068 may be of either the non-isotropic Bragg diffraction type or of the isotropic Bragg diffraction type. The frequency shifts introduced by acousto-optic modulators 1064 and 1068 are of the same sign and equal to ¼ of the desired frequency shift between the two frequency components of input beam 24. Also the direction of propagation of beam 1082 is parallel to the direction of propagation of beam 1024.

Beams 1028 and 1082 are incident on half-wave phase retardation plates 1072 and 1074, respectively, and transmitted as beams 1076 and 1078, respectively. Half-wave phase retardation plates 1072 and 1074 are oriented such that the planes of polarization of beams 1076 and 1078 are at 45 degrees to the plane of FIG. 1b. The components of beams 1076 and 1078 polarized parallel to the plane of FIG. 1b will be used as the measurement beam components in interferometer 10 and the components of beams 1076 and 1078 polarized orthogonal to the plane of FIG. 1b will be used as the reference beam components in interferometer 10.

Continuing with reference to FIG. 1b, beam 1076 is incident on polarizing beam-splitter 1044 and the respective measurement and reference beam components transmitted and reflected, respectively, as beams 1046 and 1048, respectively. Measurement beam component 1046 is transmitted by polarizing beam-splitter 1056 as a measurement beam component of beam 1058 after reflection by mirror 1054. Reference beam component 1048 is reflected by polarizing beam-splitter 1056 as reference beam component of beam 1058 after reflection by mirror 1050 and transmission by phase-shifter 1052. Beam 1058 is incident on beam-splitter 1070 and a portion thereof is reflected as a component of beam 24.

Beam 1078 is incident on polarizing beam-splitter 1030 and the respective measurement and reference beam components transmitted and reflected, respectively, as beams 1032 and 1034, respectively. Measurement beam component 1032 is transmitted by polarizing beam-splitter 1042 as a measurement beam component of beam 1060 after reflection by mirror 1036. Reference beam component 1034 is reflected by polarizing beam splitter 1042 as reference beam component of beam 1060 after reflection by mirror 1038 and transmission by phase-shifter 1040. Beam 1060 is incident on beam-splitter 1070 and a portion thereof is transmitted as a component of beam 24 after reflection by mirror 1056.

Phase-shifters 1052 and 1040 introduce phase shifts between respective reference and measurement beams according to signal 74 from electronic processor and controller 80 (see FIG. 1a). A schedule of the respective phase shifts is described in the subsequent discussions of homodyne detection methods. Phase-shifters 1052 and 1040 may be for example of the optical-mechanical type comprising for example prisms and piezoelectric translators or of the electro-optical modulator type.

Beam 24 that exits the two-frequency generator and phase shift configuration of beam-conditioner 22 comprises one reference beam and measurement beam having one frequency, a second reference beam and measurement beam having a second frequency component, and relative phases of the reference beams and the measurement beams that are controlled by electronic processor and controller 80.

Figure 1C:
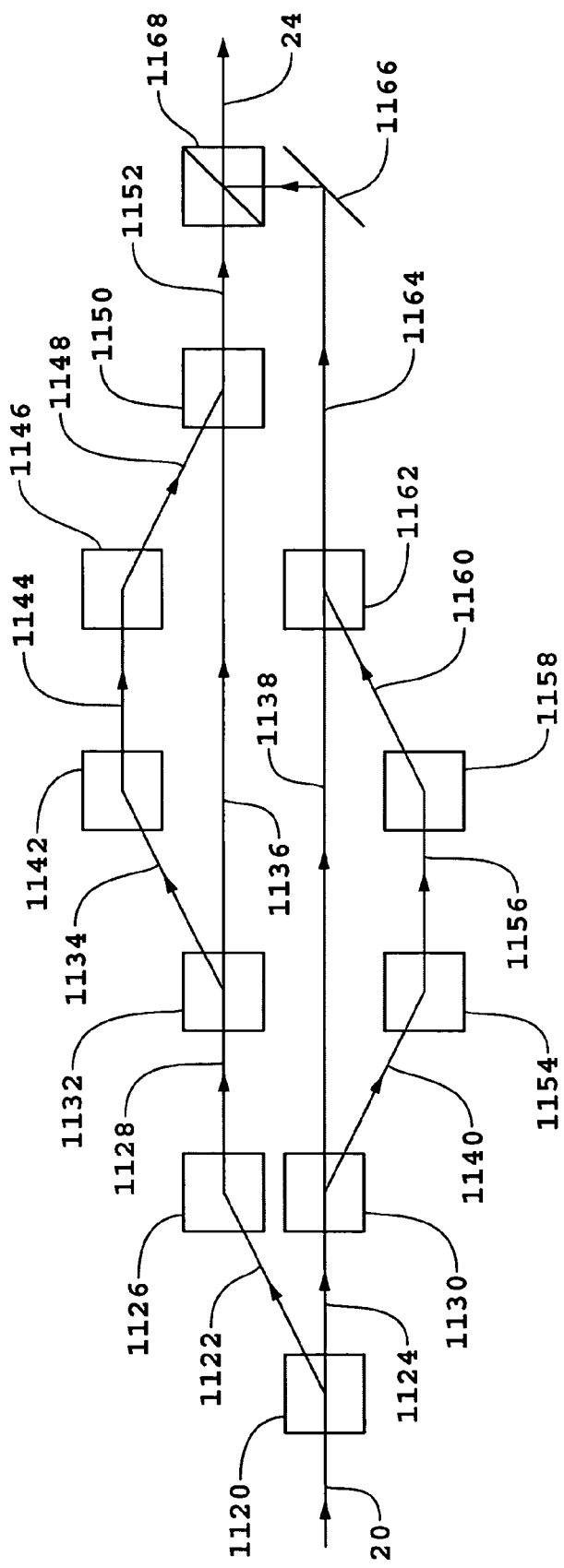
FIG. 1c is a schematic diagram of a beam-conditioner configured to operate in a two-frequency generator and frequency-shifter.

Continuing with a description of different ways to configure source 18 and beam-conditioner 22 to meet the input beam requirements of different embodiments, reference is made to FIG. 1c where beam-conditioner 22 is configured as a two-frequency generator and a frequency shifter. The two-frequency generator and frequency-shifter configuration comprises acousto-optic modulators 1120, 1126, 1130, 1132, 1142, 1146, 1150, 1154, 1058, and 1062; beam-splitter 1168; and mirror 1166.

Source 18 is configured to generate beam 20 with a single frequency component. Beam 20 is incident on acousto-optic modulator 1120 with a plane of polarization parallel to the plane of FIG. 1c. A first portion of beam 20 is diffracted by acousto-optic modulator 1120 as beam 1122 and then by acousto-optic modulator 1126 as beam 1128 having a polarization parallel to the plane of FIG. 1c. A second portion of beam 20 is transmitted as a non-diffracted beam 1124 having a plane of polarization parallel to the plane of FIG. 1c. The acoustic power to acousto-optic modulator 1120 is adjusted such that beams 1122 and 1124 have nominally the same intensity.

Acousto-optic modulators 1120 and 1126 may be of either the non-isotropic Bragg diffraction type or of the isotropic Bragg diffraction type. The frequency shifts introduced by acousto-optic modulators 1120 and 1126 are of the same sign and equal to ½ of a frequency shift $\Delta f$ that will generate in interferometer 10 a relative $\pi/2$ phase shift between a corresponding reference beam and a measurement beam that have a relative change in frequency equal to the frequency shift. The direction of propagation of beam 1128 is parallel to the direction of propagation of beam 1124.

Continuing with FIG. 1c, beam 1128 is incident on acousto-optic modulator 1132 and is either diffracted by acousto-optic modulator 1132 as beam 1134 or transmitted by acousto-optic modulator 1132 as beam 1136 according to control signal 74 (see FIG. 1a) from electronic processor and controller 80. When beam 1134 is generated, beam 1134 is diffracted by acousto-optic modulators 1142, 1146, and 1150 as a frequency-shifted beam component of beam 1152. The frequency shifts introduced by acousto-optic modulators 1132, 1142, 1146, and 1150 are all in the same direction and equal in magnitude to $\Delta f/2$. Thus the net frequency shift introduced by acousto-optic modulators 1132, 1142, 1146, and 1150 is $\pm 2\Delta f$ and will generate a relative $\pi$ phase between the respective reference and measurement beams in interferometer 10. The net frequency shift introduced by acousto-optic modulators 1120, 1126, 1132, 1142, 1146, and 1150 is $\Delta f \pm 2\Delta f$ and will generate a respective relative phase shift of $\pi/2\pm\pi$ between the respective reference and measurement beams in interferometer 10.

When beam 1136 is generated, beam 1136 is transmitted by acousto-optic modulator 1150 according to control signal 74 from electronic processor and controller 80 as a non-frequency shifted beam component of beam 1152 with respect to beam 1128. The frequency shift introduced by acousto-optic modulators 1120, 1126, and 1150 is $\Delta f$ and will generate a respective relative phase shift of $\pi/2$ between the respective reference and measurement beams in interferometer 10.

Beam 1124 is incident on acousto-optic modulator 1130 and is either diffracted by acousto-optic modulator 1130 as beam 1140 or transmitted by acousto-optic modulator 1130 as beam 1138 according to control signal 74 from electronic processor and controller 80. When beam 1140 is generated, beam 1140 is diffracted by acousto-optic modulators 1154, 1158, and 1162 as a frequency-shifted beam component of beam 1164. The frequency shifts introduced by acousto-optic modulators 1130, 1154, 1158, and 1162 are all in the same direction and equal to $\pm\Delta f/2$. Thus the net frequency shift introduced by acousto-optic modulators 1130, 1154, 1158, and 1162 is $\pm\Delta f/2$ and will generate a relative phase shift of $\pi$ between the respective reference and measurement beams on transit through interferometer 10. The net frequency shift introduced by acousto-optic modulators 1120, 1130, 1154, 1158, and 1162 is $\pm\Delta f/2$ and will generate a respective relative phase shift of $\pm\pi$ between the respective reference and measurement beams on transit through interferometer 10

When beam 1138 is generated, beam 1138 is transmitted by acousto-optic modulator 1162 according to control signal 74 from electronic processor and controller 80 as a non-frequency shifted beam component of beam 1164. The frequency shift introduced by acousto-optic modulators 1120, 1130, and 1162 is 0 and will generate a respective relative phase shift of 0 between the respective reference and measurement beams on transit through interferometer 10.

Beams 1152 and 1164 may be used directly as input beam 24 when an embodiment requires spatially separated reference and measurement beams for an input beam. When an embodiment requires coextensive reference and measurement beams as an input beam, beam 1152 and 1164 are next combined by beam-splitter 1168 to form beam 24. Acousto-optic modulators 1120, 1126, 1130, 1132, 1142, 1146, 1150, 1154, 1058, and 1062 may be either of the non-isotropic Bragg diffraction type or of the isotropic Bragg diffraction type. Beams 1152 and 1164 are both polarized in the plane of FIG. 1c for either non-isotropic Bragg diffraction type or of the isotropic Bragg diffraction type and beam-splitter 1168 is of the non-polarizing type.

With a continuation of the description of different ways to configure source 18 and beam-conditioner 22 to meet the input beam requirements of different embodiments, source 18 will preferably comprise a pulsed source. There are a number of different ways for producing a pulsed source [see Chapter 11 entitled "Lasers", *Handbook of Optics*, 1, 1995 (McGraw-Hill, New York) by W. Silfvast]. Each pulse of source 18 may comprise a single pulse or a train of pulses such as generated by a mode locked Q-switched Nd:YAG laser. A single pulse train is referenced herein as a pulse sequence and a pulse and a pulse sequence are used herein interchangeably.

Source 18 may be configured in certain embodiments to generate one or more frequencies by techniques such as described in a review article entitled "Tunable, Coherent Sources For High-Resolution VUV and XUV Spectroscopy" by B. P. Stoicheff, J. R. Banic, P. Herman, W. Jamroz, P. E. LaRocque, and R. H. Lipson in *Laser Techniques for Extreme Ultraviolet Spectroscopy*, T. J. McIlrath and R. R. Freeman, Eds., (American Institute of Physics) p 19 (1982) and references therein. The techniques include for example second and third harmonic generation and parametric generation such as described in the articles entitled "Generation of Ultraviolet and Vacuum Ultraviolet Radiation" by S. E. Harris, J. F. Young, A. H. Kung, D. M. Bloom, and G. C. Bjorklund in *Laser Spectroscopy I*, R. G. Brewer and A. Mooradi, Eds. (Plenum Press, New York) p 59, (1974) and "Generation of Tunable Picosecond VUV Radiation" by A. H. Kung, *Appl. Phys. Lett.* 25, p 653 (1974). The contents of the three cited articles are herein incorporated in their entirety by reference.

The output beams from source 18 comprising two or four frequency components may be combined in beam-conditioner 22 by beam-splitters to form coextensive measurement and reference beams that are either spatially separated or coextensive as required in various embodiments. When source 18 is configured to furnish two or four frequency components, the frequency shifting of the various components required in certain embodiments may be introduced in source 18 for example by frequency modulation of input beams to parametric generators and the phase shifting of reference beams relative to measurement beams in beam-conditioner 22 may be achieved by phase shifters of the optical-mechanical type comprising for example prisms or mirrors and piezoelectric translators or of the electro-optical modulator type.

The general description of embodiments incorporating aspects of the present invention is continued with reference to FIG. 1a. Input beam 24 is incident on interferometer 10 wherein reference beams and measurement beams are present in input beam 24 or are generated from input beam 24 in interferometer 10. The reference beams and measurement beams comprise two arrays of reference beams and two arrays of measurement beams wherein the arrays may comprise arrays of one element. The arrays of measurement beams are incident on or focused on and/or in substrate 60 and arrays of return measurement beams are generated by reflection/scattering and/or transmission by the substrate. In the case of single element arrays for the reference beams and measurement beams, the measurement beams are generally reflected or transmitted by substrate 60. The arrays of reference beams and return measurement beams are combined by a beam-splitter to form two arrays of output beam components. The arrays of output beam components are mixed with respect to state of polarization either in interferometer 10 or in detector 70. The arrays of output beams are subsequently focused to spots on pixels of a multi-pixel or single pixel detector as required and detected to generate electrical interference signal 72.

There are four different implementations of the homodyne detection method that are used in interferometric embodiments. The four different implementations are referred to as single-, double-, bi-, and quad-homodyne detection methods. For the single-homodyne detection method, input beam 24 comprises a single frequency component and a set of four measurements of the array of electrical interference signals 72 is made. For each of the four measurements of the array of electrical interference signals 72, a known phase shift is introduced between the reference beam component and respective return measurement beam components of output beam 32. The subsequent data processing procedure used to extract the conjugated quadratures of the reflected and/or scattered or transmitted return measurement beam for an input beam comprising a single frequency component is described for example in commonly owned U.S. Pat. No. 6,445,453 (ZI-14) entitled "Scanning Interferometric Near-Field Confocal Microscopy" by Henry A. Hill, the contents of which are herein incorporated in their entirety by reference.

The double-homodyne detection method uses input beam 24 comprising four frequency components and four detectors to obtain measurements of electrical interference signals that are subsequently used to obtain conjugated quadratures. Each detector element of the four detector elements obtains a different one of the four electrical interference signal values with the four electrical interference signal values obtained simultaneously to compute the conjugated quadratures for a field. Each of the four electrical interference signal values contains only information relevant to one orthogonal component of the conjugated quadratures. The double-homodyne detection used herein is related to the detection methods such as described in Section IV of the article by G. M D'ariano and M G. A. Paris entitled "Lower Bounds On Phase Sensitivity In Ideal And Feasible Measurements," *Phys. Rev.* A 49, 3022–3036 (1994). Accordingly, the double-homodyne detection method does not make joint determinations of conjugated quadratures of fields wherein each electrical interference signal value contains information simultaneously about each of two orthogonal components of the conjugated quadratures.

The bi- and quad-homodyne detection methods obtain measurements of electrical interference signals wherein each measured value of an electrical interference signal contains simultaneously information about two orthogonal components of conjugated quadratures. The two orthogonal components correspond to orthogonal components of conjugated quadratures such as described in cited U.S. Provisional Patent Application No. 60/442,858 (ZI-47) and cited U.S. Patent Application filed Jan. 27, 2004 (ZI-47) entitled "Apparatus and Method for Joint Measurements of Conjugated Quadratures of Fields of Reflected/Scattered and Transmitted Beams by an Object in Interferometry."

Conjugated quadratures of fields of the return measurement beam are obtained by single-, double-, bi-, and quad-homodyne detection methods in the interferometric embodiments. For each of the homodyne detection methods, a set of four measurements of the array of electrical interference signals 72 is made. For each of the four measurements of the array of electrical interference signals 72, a known phase shift is introduced between the reference beam components and respective return measurement beam components of output beam 32. A nonlimiting example of a known set of phase shifts comprise 0, π/4, π/2, and 3π/2 radians, mod 2π.

Input beam 24 comprises for interferometric embodiments one frequency component for the single-homodyne detection method. For the bi-homodyne detection method, input beam 24 comprises two frequency components and for double- and quad-homodyne detection methods, input beam 24 comprises four frequency components. The phase shifts are generated by either shifting the frequencies of frequency components of input beam 24 between known frequency values or by introducing phase shifts between the reference and measurement beam components of input beam 24. In certain of the interferometric embodiments, there is a difference between the optical path lengths of the reference beam components and the respective return beam components of output beam components such as for output beam 32 in interferometer 10. As a consequence, a change in frequency of a frequency component of input beam 24 will generate a relative phase shift between the corresponding reference beam components and the respective return beam components of output beam 32.

For an optical path difference L between the reference beam components and the respective return measurement beam components of output beam 32, there will be for a frequency shift Δf a corresponding phase shift φ where $$\varphi = 2\pi L\left(\frac{\Delta f}{c}\right) \quad (4)$$

and c is the free space speed of light. Note that L is not a physical path length difference and depends for example on the average index of refraction of the measurement beam and the return measurement beam paths. For an example of a phase shift $\varphi=\pi, 3\pi, 5\pi, \ldots$ and a value of L=0.25 m, the corresponding frequency shifts are $\Delta f=600$ MHz, 1.8 GHz, 3.0 GHz, . . . .

The frequencies of components of input beam 24 are determined by the mode of operation of source 18 and of beam-conditioner 22 according to control signals 92 and 74, respectively, generated by electronic processor and controller 80.

Referring to the bi-homodyne detection method, a set of four electrical interference signal values are obtained for each pair of spots in or on substrate 60 being imaged such as described in commonly owned U.S. Provisional Patent Application No. 60/442,858 (ZI-47) and entitled "Apparatus and Method for Joint Measurements of Conjugated Quadratures of Fields of Reflected/Scattered Beams by an Object in Interferometry" and U.S. patent application Ser. No. 10/765, 369, filed Jan. 27, 2004 (ZI-47) and entitled "Apparatus and Method for Joint Measurements of Conjugated Quadratures of Fields of Reflected/Scattered and Transmitted Beams by an Object in Interferometry" both of which are by Henry A. Hill. The contents of both the cited U.S. Provisional Patent Application and the U.S. Patent Application are herein incorporated in their entirety by reference. The set of four electrical interference signal values $S_j$, j=1,2,3,4 used for obtaining conjugated quadratures of fields for a single a spot on and/or in a substrate being imaged is represented for the bi-homodyne detection within a scale factor by the formula $$S_j = P_j \begin{Bmatrix} \xi_j^2|A_1|^2 + \zeta_j^2|B_1|^2 + \eta_j^2|C_1|^2 + \\ \zeta_j\eta_j 2|B_1||C_1|\cos\varphi_{B_1C_1\varepsilon_j} + \\ \xi_j\zeta_j 2|A_1||B_1|\cos\varphi_{A_1B_1\varepsilon_j} + \\ \varepsilon_j\xi_j\eta_j 2|A_1||C_1|\cos\varphi_{A_1C_1} + \\ \xi_j^2|A_2|^2 + \zeta_j^2|B_2|^2 + \eta_j^2|C_2|^2 + \\ \zeta_j\eta_j 2|B_2||C_2|\cos\varphi_{B_2C_2\gamma_j} + \\ \xi_j\zeta_j 2|A_2||B_2|\cos\varphi_{A_2B_2\gamma_j} + \\ \gamma_j\xi_j\eta_j 2|A_2||C_2|\cos\varphi_{A_2C_2} \end{Bmatrix} \quad (1)$$

where coefficients $A_1$ and $A_2$ represent the amplitudes of the reference beams corresponding to the first and second frequency components of the input beam; coefficients $B_1$ and $B_2$ represent the amplitudes of background beams corresponding to reference beams $A_1$ and $A_2$, respectively; coefficients $C_1$ and $C_2$ represent the amplitudes of the return measurement beams corresponding to reference beams $A_1$ and $A_2$, respectively; $P_j$ represents the integrated intensity of the first frequency component of the input beam in pulse j of the pulse sequence; and the values for $\epsilon_j$ and $\gamma_j$ are listed in Table 1. The change in the values of $\epsilon_j$ and $\gamma_j$ from 1 to −1 or from −1 to 1 correspond to changes in relative phases of respective reference and measurement beams. The coefficients $\xi_j$, $\zeta_j$, and $\eta_j$ represent effects of variations in properties of a conjugate set of four pinholes such as size and shape used in the generation of the spot on and/or in substrate 60 and the sensitivities of a conjugate set of four detector pixels corresponding to the spot on and/or in substrate 60 for the reference beam, the background beam, and the return measurement beam, respectively.

TABLE 1

| j | $\epsilon_j$ | $\gamma_j$ | $\epsilon_j\gamma_j$ |
|---|---|---|---|
| 1 | 1 | 1 | 1 |
| 2 | −1 | −1 | 1 |
| 3 | −1 | 1 | −1 |
| 4 | 1 | −1 | −1 |

It is assumed in Equation (5) that the ratio of $|A_2|/|A_1|$ is not dependent on j or on the value of $P_j$. In order to simplify the representation of $S_j$ so as to project the important features without departing from either the scope or spirit of the present invention, it is also assumed in Equation (5) that the ratio of the amplitudes of the return measurement beams corresponding to $A_2$ and $A_1$ is not dependent on j or on the value of $P_j$. However, the ratio $|C_2|/|C_1|$ will be different from the ratio $|A_2|/|A_1|$ when the ratio of the amplitudes of the measurement beam components corresponding to $A_2$ and $A_1$ are different from the ratio $|A_2|/|A_1|$.

Noting that $\cos \phi_{A_2C_2} = \pm \sin \phi_{A_1C_1}$ by the control of the relative phase shifts between corresponding reference and return measurement beam components in beam 32, Equation (5) may be rewritten as $$S_j = P_j \left\{ \begin{array}{l} \xi_j^2(|A_1|^2 + |A_2|^2) + \zeta_j^2(|B_1|^2 + |B_2|^2) + \eta_j^2(|C_1|^2 + |C_2|^2) + \\ 2\xi_j\zeta_j(|A_1||B_1|\cos\varphi_{A_1B_1\epsilon_j} + |A_2||B_2|\cos\varphi_{A_2B_2\gamma_j}) + \\ 2\xi_j\eta_j \left[ \begin{array}{l} \epsilon_j|A_1||C_1|\cos\varphi_{A_1C_1} + \\ \gamma_j\left(\frac{|A_2|}{|A_1|}\right)\left(\frac{|C_2|}{|C_1|}\right)|A_1||C_1|\sin\varphi_{A_1C_1} \end{array} \right] + \\ 2\zeta_j\eta_j(\epsilon_j|B_1||C_1|\cos\varphi_{B_1C_1\epsilon_j} + \gamma_j|B_2||C_2|\cos\varphi_{B_2C_2\gamma_j}) \end{array} \right\} \quad (6)$$

where the relationship $\cos \phi_{A_2C_2} = \sin \phi_{A_1C_1}$ has been used without departing from either the scope or spirit of the present invention.

The change in phase $\phi_{A_1B_1\epsilon_j}$, $\phi_{A_2B_2\gamma_j}$ for a change in $\epsilon_j$ and the change in phase $\phi_{A_1B_1\epsilon_j}$, $\phi_{A_2B_2\gamma_j}$ for a change in $\gamma_j$ may be different from π in embodiments depending on where and how the background beam is generated. It may be of value in evaluating the effects of the background beams to note that the factor $\cos \phi_{B_1C_1\epsilon_j}$ may be written as $\cos [\phi_{A_1C_1} + (\phi_{B_1C_1\epsilon_j} - \phi_{A_1C_1})]$ where the phase difference $(\phi_{B_1C_1\epsilon_j} - \phi_{A_1C_1})$ is the same as the phase $\phi_{A_1B_1\epsilon_j}$, i.e., $\cos \phi_{B_1C_1\epsilon_j} = \cos(\phi_{A_1C_1} + \phi_{A_1B_1\epsilon_j})$.

It is evident from inspection of Equation (6) that the term in Equation (6) corresponding to the component of conjugated quadratures $|C_1|\cos \phi_{A_1C_1}$ is a rectangular function that has a mean value of zero and is symmetric about j=2.5 since $\epsilon_j$ is symmetric about j=2.5. In addition the term in Equation (6) corresponding to the component of conjugated quadratures $|C_1|\sin \phi_{A_1C_1}$ in Equation (6) is a rectangular function that has a mean value of zero and is antisymmetric about j=2.5 since $\gamma_j$ is a antisymmetric function about j=2.5. Another important property by the design of the bi-homodyne detection method is that the conjugated quadratures $|C_1|\cos \phi_{A_1C_1}$ and $|C_1|\sin \phi_{A_1C_1}$ terms are orthogonal over the range of j=1,2,3,4 since $\epsilon_j$ and $\gamma_j$ are orthogonal over the range of j=1,2,3,4, i.e., $\sum_{j=1}^{4} \epsilon_j \gamma_j = 0$.

Information about conjugated quadratures $|C_1|\cos \phi_{A_1C_1}$ and $|C_1|\sin \phi_{A_1C_1}$ is obtained using the symmetric and antisymmetric properties and orthogonality property of the conjugated quadratures terms in Equation (6) as represented by the following digital filters applied to the signal values $S_j$:

$$F_1(S) = \sum_{j=1}^{4} \epsilon_j \frac{S_j}{P_j' \xi_j'^2} = (|A_1|^2 + |A_2|^2) \sum_{j=1}^{4} \epsilon_j \left(\frac{P_j}{P_j'}\right)\left(\frac{\xi_j^2}{\xi_j'^2}\right) + \quad (7)$$

$$(|B_1|^2 + |B_2|^2) \sum_{j=1}^{4} \epsilon_j \left(\frac{P_j}{P_j'}\right)\left(\frac{\zeta_j^2}{\xi_j'^2}\right) + (|C_1|^2 + |C_2|^2) \sum_{j=1}^{4} \epsilon_j \left(\frac{P_j}{P_j'}\right)\left(\frac{\eta_j^2}{\xi_j'^2}\right) +$$

$$2|A_1||C_1|\cos\varphi_{A_1C_1} \sum_{j=1}^{4} \epsilon_j\gamma_j \left(\frac{P_j}{P_j'}\right)\left(\frac{\xi_j\eta_j}{\xi_j'^2}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \epsilon_j\gamma_j \left(\frac{P_j}{P_j'}\right)\left(\frac{\xi_j\eta_j}{\xi_j'^2}\right) +$$

$$2|A_1||B_1| \sum_{j=1}^{4} \epsilon_j \left(\frac{P_j}{P_j'}\right)\left(\frac{\xi_j\zeta_j}{\xi_j'^2}\right) \cos\varphi_{A_1B_1\epsilon_j} +$$

$$2|A_2||B_2| \sum_{j=1}^{4} \epsilon_j \left(\frac{P_j}{P_j'}\right)\left(\frac{\xi_j\zeta_j}{\xi_j'^2}\right) \cos\varphi_{A_2B_2\gamma_j} +$$

$$2|B_1||C_1| \sum_{j=1}^{4} \left(\frac{P_j}{P_j'}\right)\left(\frac{\zeta_j\eta_j}{\xi_j'^2}\right) \cos\varphi_{B_1C_1\epsilon_j} +$$

$$2|B_2||C_2| \sum_{j=1}^{4} \epsilon_j\gamma_j \left(\frac{P_j}{P_j'}\right)\left(\frac{\zeta_j\eta_j}{\xi_j'^2}\right) \cos\varphi_{B_2C_2\gamma_j}, \text{ and}$$

$$F_2(S) = \sum_{j=1}^{4} \gamma_j \frac{S_j}{P_j' \xi_j'^2} = (|A_1|^2 + |A_2|^2) \sum_{j=1}^{4} \gamma_j \left(\frac{P_j}{P_j'}\right)\left(\frac{\xi_j^2}{\xi_j'^2}\right) + \quad (8)$$

$$(|B_1|^2 + |B_2|^2) \sum_{j=1}^{4} \gamma_j \left(\frac{P_j}{P_j'}\right)\left(\frac{\zeta_j^2}{\xi_j'^2}\right) +$$

-continued $$(|C_1|^2 + |C_2|^2) \sum_{j=1}^{4} \gamma_j \left(\frac{P_j}{P'_j}\right)\left(\frac{\eta_j^2}{\xi_j'^2}\right) +$$

$$2|A_1||C_1|\cos\varphi_{A_1C_1} \sum_{j=1}^{4} \varepsilon_j \gamma_j \left(\frac{P_j}{P'_j}\right)\left(\frac{\xi_j \eta_j}{\xi_j'^2}\right) +$$

$$2\left(\frac{|A_2|}{|A_1|}\right)\left(\frac{|C_2|}{|C_1|}\right)|A_1||C_1|\sin\varphi_{A_1C_1} \sum_{j=1}^{4} \left(\frac{P_j}{P'_j}\right)\left(\frac{\xi_j \eta_j}{\xi_j'^2}\right) +$$

$$2|A_1||B_1| \sum_{j=1}^{4} \gamma_j \left(\frac{P_j}{P'_j}\right)\left(\frac{\xi_j \zeta_j}{\xi_j'^2}\right)\cos\varphi_{A_1B_1\varepsilon_j} +$$

$$2|A_2||B_2| \sum_{j=1}^{4} \gamma_j \left(\frac{P_j}{P'_j}\right)\left(\frac{\xi_j \zeta_j}{\xi_j'^2}\right)\cos\varphi_{A_2B_2\gamma_j} +$$

$$2|B_1||C_1| \sum_{j=1}^{4} \varepsilon_j \gamma_j \left(\frac{P_j}{P'_j}\right)\left(\frac{\zeta_j \eta_j}{\xi_j'^2}\right)\cos\varphi_{B_1C_1\varepsilon_j} +$$

$$2|B_2||C_2| \sum_{j=1}^{4} \left(\frac{P_j}{P'_j}\right)\left(\frac{\zeta_j \eta_j}{\xi_j'^2}\right)\cos\varphi_{B_2C_2\gamma_j},$$

where $\xi'_j$ and $P'_j$ are values used in the digital filters to represent $\xi_j$ and $P_j$.

The parameter $$\left[\left(\frac{|A_2|}{|A_1|}\right)\left(\frac{|C_2|}{|C_1|}\right)\right] \quad (9)$$

in Equations (7) and (8) needs to be determined in order complete the determination of a conjugated quadratures. The parameter given in Equation (9) can be measured for example by introducing π/2 phase shifts into the relative phase of the reference beam and the measurement beam and repeating the measurement for the conjugated quadratures. The ratio of the amplitudes of the conjugated quadratures corresponding to (sin $\phi_{A_1C_1}$/cos $\phi_{A_1C_1}$) from the first measurement divided by the ratio of the amplitudes of the conjugated quadratures corresponding to (sin $\phi_{A_1C_1}$/cos $\phi_{A_1C_1}$) from the second measurement is equal to $$\left[\left(\frac{|A_2|}{|A_1|}\right)\left(\frac{|C_2|}{|C_1|}\right)\right]^2. \quad (10)$$

Note that certain of the factors in Equations (7) and (8) have nominal values of 4 within scale factors, e.g., $$\sum_{j=1}^{4} \left(\frac{P_j}{P'_j}\right)\left(\frac{\xi_j \eta_j}{\xi_j'^2}\right) \simeq 4, \quad \sum_{j=1}^{4} \left(\frac{P_j}{P'_j}\right)\left(\frac{\zeta_j \eta_j}{\xi_j'^2}\right) \simeq 4. \quad (11)$$

The scale factors correspond to the average values for the ratios of $\xi'_j/\eta_j$ and $\xi'_j/\zeta_j$, respectively, assuming that the average value of $P_j/P'_j \simeq 1$. Certain other of the factors in Equations (7) and (8) have nominal values of zero, e.g., $$\sum_{j=1}^{4} \varepsilon_j \left(\frac{P_j}{P'_j}\right)\left(\frac{\xi_j^2}{\xi_j'^2}\right) \simeq 0, \quad \sum_{j=1}^{4} \varepsilon_j \left(\frac{P_j}{P'_j}\right)\left(\frac{\zeta_j^2}{\xi_j'^2}\right) \simeq 0, \quad (12)$$

$$\sum_{j=1}^{4} \varepsilon_j \left(\frac{P_j}{P'_j}\right)\left(\frac{\eta_j^2}{\xi_j'^2}\right) \simeq 0,$$

$$\sum_{j=1}^{4} \gamma_j \left(\frac{P_j}{P'_j}\right)\left(\frac{\xi_j^2}{\xi_j'^2}\right) \simeq 0, \quad \sum_{j=1}^{4} \gamma_j \left(\frac{P_j}{P'_j}\right)\left(\frac{\zeta_j^2}{\xi_j'^2}\right) \simeq 0,$$

$$\sum_{j=1}^{4} \gamma_j \left(\frac{P_j}{P'_j}\right)\left(\frac{\eta_j^2}{\xi_j'^2}\right) \simeq 0,$$

$$\sum_{j=1}^{4} \varepsilon_j \gamma_j \left(\frac{P_j}{P'_j}\right)\left(\frac{\xi_j \eta_j}{\xi_j'^2}\right) \simeq 0.$$

The remaining factors, $$\sum_{j=1}^{4} \varepsilon_j \left(\frac{P_j}{P'_j}\right)\left(\frac{\xi_j \zeta_j}{\xi_j'^2}\right)\cos\varphi_{A_1B_1\varepsilon_j}, \quad (13)$$

$$\sum_{j=1}^{4} \varepsilon_j \left(\frac{P_j}{P'_j}\right)\left(\frac{\xi_j \zeta_j}{\xi_j'^2}\right)\cos\varphi_{A_2B_2\gamma_j},$$

$$\sum_{j=1}^{4} \left(\frac{P_j}{P'_j}\right)\left(\frac{\zeta_j \eta_j}{\xi_j'^2}\right)\cos\varphi_{B_1C_1\varepsilon_j},$$

$$\sum_{j=1}^{4} \varepsilon_j \gamma_j \left(\frac{P_j}{P'_j}\right)\left(\frac{\zeta_j \eta_j}{\xi_j'^2}\right)\cos\varphi_{B_2C_2\gamma_j},$$

$$\sum_{j=1}^{4} \gamma_j \left(\frac{P_j}{P'_j}\right)\left(\frac{\xi_j \zeta_j}{\xi_j'^2}\right)\cos\varphi_{A_1B_1\varepsilon_j},$$

$$\sum_{j=1}^{4} \gamma_j \left(\frac{P_j}{P'_j}\right)\left(\frac{\xi_j \zeta_j}{\xi_j'^2}\right)\cos\varphi_{A_2B_2\gamma_j},$$

$$\sum_{j=1}^{4} \varepsilon_j \gamma_j \left(\frac{P_j}{P'_j}\right)\left(\frac{\zeta_j \eta_j}{\xi_j'^2}\right)\cos\varphi_{B_1C_1\varepsilon_j},$$

$$\sum_{j=1}^{4} \left(\frac{P_j}{P'_j}\right)\left(\frac{\zeta_j \eta_j}{\xi_j'^2}\right)\cos\varphi_{B_2C_2\gamma_j},$$

will have nominal magnitudes ranging from approximately zero to approximately 4 times a cosine factor and either the average value of factor $(P_j/P'_j)(\xi_j\zeta_j/\xi_j'^2)$ or $(P_j/P'_j)(\zeta_j\eta_j/\xi_j'^2)$ depending on the properties respective phases. For the portion of the back ground with phases that do not track to a first approximation the phases of the measurement beams, the magnitudes of all of the terms listed in the Equation (13) will be approximately zero. For the portion of the background with phases that do track to a first approximation the phases of the respective measurement beams, the magnitudes of the terms listed in Equation (13) will be approximately 4 times a cosine factor and either the average value of factor $(P_j/P'_j)(\xi_j\zeta_j/\xi'^2_j)$ and or factor $(P_j/P'_j)(\zeta_j\eta_j/\nu'^2_j)$.

The two largest terms in Equations (7) and (8) are generally the terms that have the factors $(|A_1|^2+|A_2|^2)$ and $(|B_1|^2+|B_2|^2)$. However, the corresponding terms are substantially eliminated by selection of $\xi'_j$ values for the terms that have $(|A_1|^2+|A_2|^2)$ as a factor and by the design of $\zeta_j$ values for the terms that have $(|B_1|^2+|B_2|^2)$ as a factor as shown in Equation (12).

The largest contribution from effects of background is represented by the contribution to the interference term between the reference beam and the portion of the background beam generated by the measurement beam component of beam 28. This portion of the effect of the background can be measured by measuring the corresponding conjugated quadratures of the portion of the background with the return measurement beam component of beam 32 set equal to zero, i.e., measuring the respective electrical interference signals $S_j$ with substrate 60 removed and with either $|A_2|=0$ or $|A_1|=0$ and visa versa. The measured conjugated quadratures of the portion of the effect of the background can than used to compensate for the respective background effects beneficially in an end use application if required.

Information about the largest contribution from effects of background amplitude $2\xi_j\zeta_j|A_1||B_1|$ and phase $\phi_{A_1B_1\epsilon_j}$, i.e., the interference term between the reference beam and the portion of background beam generated by the measurement beam component of beam 28, may be obtained by measuring $S_j$ for $j=1,2,3,4$ as a function of relative phase shift between reference beam and the measurement beam component of beam 28 with substrate 60 removed and either $|A_2|=0$ or $|A_1|=0$ and visa versa and Fourier analyzing the measured values of $S_j$. Such information can be used to help identify the origin of the respective background.

Other techniques may be incorporated into other embodiments to reduce and/or compensate for the effects of background beams without departing from either the scope or spirit of the present invention such as described in commonly owned U.S. Pat. No. 5,760,901 entitled "Method And Apparatus For Confocal Interference Microscopy With Background Amplitude Reduction and Compensation," U.S. Pat. No. 5,915,048 entitled "Method and Apparatus for Discrimination In-Focus Images from Out-of-Focus Light Signals from Background and Foreground Light Sources," and U.S. Pat. No. 6,480,285 B1 wherein each of the three patents are by Henry A. Hill. The contents of each of the three cited patents are herein incorporated in their entirety by reference.

The selection of values for $\xi'_j$ is based on information about coefficients $\xi_j$ for $j=1,2,3,4$ that may be obtained by measuring the $S_j$ for $j=1,2,3,4$ with only the reference beam present in the interferometer system. In certain embodiments, this may correspond simply blocking the measurement beam components of input beam 24 and in certain other embodiments, this may correspond to simply measuring the $S_j$ for $j=1,2,3,4$ with substrate 60 removed. A test of the correctness of a set of values for $\xi'_j$ is the degree to which the $(|A_1|^2+|A_2|^2)$ terms in Equations (7) and (8) are zero.

Information about coefficients $\xi_j\eta_j$ for $j=1,2,3,4$ may be obtained by scanning an artifact past the spots corresponding to the respective four conjugate detector pixels with either $|A_2|=0$ or $|A_1|=0$ and measuring the conjugated quadratures component $2|A_1||C_1|\cos \phi_{A_1C_1}$ or $2|A_1||C_1|\sin \phi_{A_1C_1}$, respectively. A change in the amplitude of the $2|A_1||C_1|\cos \phi_{A_1C_1}$ or $2|A_1||C_1|\sin \phi_{A_1C_1}$ term corresponds to a variation in $\xi_j\eta_j$ as a function of j. Information about the coefficients $\xi_j\eta_j$ for $j=1,2,3,4$ may be used for example to monitor the stability of one or more elements of interferometer system 10.

The bi-homodyne detection method is a robust technique for the determination of conjugated quadratures of fields. First, the conjugated quadratures $|C_1|\cos \phi_{A_1C_1}$ and $|C_1|\sin \phi_{A_1C_1}$ are the primary terms in the digitally filtered values $F_1(S)$ and $F_2(S)$, respectively, since as noted in the discussion with respect to Equation (12), the terms with the factors $(|A_1|^2+|A_2|^2)$ and $(|B_1|^2+|B_2|^2)$ are substantially zero.

Secondly, the coefficients of $|C_1|\cos \phi_{A_1C_1}$ and $|C_2|\sin \phi_{A_1C_1}$ terms in Equations (7) and (8) are identical. Thus highly accurate measurements of the interference terms between the return measurement beam and the reference beam with respect to amplitudes and phases, i.e., highly accurate measurements of conjugated quadratures of fields can be measured wherein first order variations in $\xi_j$ and first order errors in normalizations such as $(P_j/P'_j)$ and $(\xi_j^2/\xi'^2_j)$ enter in only second or higher order. This property translates into a significant advantage. Also, the contributions to each component of the conjugated quadratures $|C_1|\cos \phi_{A_1C_1}$ and $|C_1|\sin \phi_{A_1C_1}$ from a respective set of four electrical interference signal values have the same window function and thus are obtained as jointly determined values.

Other distinguishing features of the bi-homodyne technique are evident in Equations (7) and (8): the coefficients of the conjugated quadratures $|C_1|\cos \phi_{A_1C_1}$ and $|C_1|\sin \phi_{A_1C_1}$ in Equations (7) and (8), respectively, corresponding to the first equation of Equations (11) are identical independent of errors in assumed values for $\xi_j$ and $\eta_j$; the coefficients of the conjugated quadratures $|C_1|\sin \phi_{A_1C_1}$ and $|C_1|\cos \phi_{A_1C_1}$ in Equations (7) and (8), respectively, corresponding to the fourth equation of Equations (12) are identical independent of errors in assumed values for $\xi'_j$. Thus highly accurate values of the phases corresponding to conjugated quadratures can be measured with first order variations in $\xi_j$ and first order errors in normalizations such as $(P_j/P'_j)$ and $(\xi_j^2/\xi'^2_j)$ enter in only through some high order effect.

It is also evident that since the conjugated quadratures of fields are obtained jointly when using the bi-homodyne detection method, there is a significant reduction in the potential for an error in tracking phase as a result of a phase redundancy unlike the situation possible in single-homodyne detection of conjugated quadratures of fields.

There are a number of advantages of the bi-homodyne detection as a consequence of the conjugated quadratures of fields being jointly acquired quantities. One advantage is a reduced sensitivity the effects of an overlay error of a spot in or on the substrate that is being imaged and a conjugate image of conjugate pixel of a multi-pixel detector during the acquisition of four electrical interference signal values of each spot in and/or on a substrate imaged using interferometric confocal microscopy. Overlay errors are errors in the set of four conjugate images of a respective set of conjugate detector pixels relative to the spot being imaged.

Another advantage is that when operating in the scanning mode there is a reduced sensitivity to effects of pinhole-to-pinhole variations in properties of a conjugate set of pinholes used in a confocal microscopy system that are conjugate to a spot in or on the substrate being imaged at different times during the scan.

Another advantage is that when operating in the scanning mode there is a reduced sensitivity to effects of pixel-to-pixel variation of properties within a set of conjugate pixels that are conjugate to a spot in or on the substrate being imaged at different times during the scan.

Another advantage is that when operating in the scanning mode there is reduced sensitivity to effects of pulse-to-pulse variations of a respective conjugate set of pulses of the input beam 24 to the interferometer system.

The pinholes and pixels of a multi-pixel detector of a set of conjugate pinholes and conjugate pixels of a multi-pixel detector may comprise contiguous pinholes of an array of pinholes and/or contiguous pixels of a multi-pixel detector or may comprise selected pinholes from an array of pinholes and/or pixels from an array of pixels wherein the separation between the selected pinholes is an integer number of pinhole separations and the separation between an array of respective pixels corresponds to an integer number of pixel separations without loss of lateral and/or longitudinal resolution and signal-to-noise ratios. The corresponding scan rate would be equal to the integer times the spacing of spots on the measurement object 60 conjugate to set of conjugate pinholes and/or set of conjugate pixels divided by the read out rate of the multi-pixel detector. This property permits a significant increase in through put for an interferometric confocal microscope with respect to the number of spots in and/or on a substrate imaged per unit time.

Referring to the quad-homodyne detection method, a set of four electrical interference signal values is obtained for each spot on and/or in substrate 60 being imaged with two pulse sequences from source 18 and beam-conditioner beam-conditioner 22. The set of four electrical interference signal values $S_j$, j=1,2,3,4 used for obtaining conjugated quadratures of fields for a single a spot on and/or in a substrate being imaged is represented for the quad-homodyne detection within a scale factor by the formulae $$S_1 = P_1 \begin{Bmatrix} \xi_1^2|A_1|^2 + \zeta_1^2|B_1|^2 + \eta_1^2|C_1|^2 + \\ \zeta_1\eta_1 2|B_1||C_1|\cos\varphi_{B_1C_1\varepsilon_1} + \\ \xi_1\zeta_1 2|A_1||B_1|\cos\varphi_{A_1B_1\varepsilon_1} + \\ \varepsilon_1\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \\ \zeta_1\eta_1 2|B_2||C_2|\cos\varphi_{B_2C_2\gamma_1} + \\ \xi_1\zeta_1 2|A_2||B_2|\cos\varphi_{A_2B_2\gamma_1} + \\ \gamma_1\xi_1\eta_1 2|A_2||C_2|\cos\varphi_{A_2C_2} \end{Bmatrix}, \quad (14)$$

$$S_2 = P_1 \begin{Bmatrix} \xi_2^2|A_3|^2 + \zeta_2^2|B_3|^2 + \eta_2^2|C_3|^2 + \\ \zeta_2\eta_2 2|B_3||C_3|\cos\varphi_{B_3C_3\varepsilon_2} + \\ \xi_2\zeta_2 2|A_3||B_3|\cos\varphi_{A_3B_3\varepsilon_2} + \\ \varepsilon_2\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \\ \zeta_2\eta_2 2|B_4||C_4|\cos\varphi_{B_4C_4\gamma_2} + \\ \xi_2\zeta_2 2|A_4||B_4|\cos\varphi_{A_4B_4\gamma_2} + \\ \gamma_2\xi_2\eta_2 2|A_4||C_4|\cos\varphi_{A_4C_4} \end{Bmatrix}, \quad (15)$$

$$S_3 = P_2 \begin{Bmatrix} \xi_1^2|A_1|^2 + \zeta_1^2|B_1|^2 + \eta_1^2|C_1|^2 + \\ \zeta_1\eta_1 2|B_1||C_1|\cos\varphi_{B_1C_1\varepsilon_3} + \\ \xi_1\zeta_1 2|A_1||B_1|\cos\varphi_{A_1B_1\varepsilon_3} + \\ \varepsilon_3\xi_1\eta_1 2|A_1||C_1|\cos\varphi_{A_1C_1} + \\ \xi_1^2|A_2|^2 + \zeta_1^2|B_2|^2 + \eta_1^2|C_2|^2 + \\ \zeta_1\eta_1 2|B_2||C_2|\cos\varphi_{B_2C_2\gamma_3} + \\ \xi_1\zeta_1 2|A_2||B_2|\cos\varphi_{A_2B_2\gamma_3} + \\ \gamma_3\xi_1\eta_1 2|A_2||C_2|\cos\varphi_{A_2C_2} \end{Bmatrix}, \quad (16)$$

$$S_4 = P_2 \begin{Bmatrix} \xi_2^2|A_3|^2 + \zeta_2^2|B_3|^2 + \eta_2^2|C_3|^2 + \\ \zeta_2\eta_2 2|B_3||C_3|\cos\varphi_{B_3C_3\varepsilon_4} + \\ \xi_2\zeta_2 2|A_3||B_3|\cos\varphi_{A_3B_3\varepsilon_4} + \\ \varepsilon_4\xi_2\eta_2 2|A_3||C_3|\cos\varphi_{A_3C_3} + \\ \xi_2^2|A_4|^2 + \zeta_2^2|B_4|^2 + \eta_2^2|C_4|^2 + \\ \zeta_2\eta_2 2|B_4||C_4|\cos\varphi_{B_4C_4\gamma_4} + \\ \xi_2\zeta_2 2|A_4||B_4|\cos\varphi_{A_4B_4\gamma_4} + \\ \gamma_4\xi_2\eta_2 2|A_4||C_4|\cos\varphi_{A_4C_4} \end{Bmatrix}, \quad (17)$$

where coefficients $A_1$, $A_2$, $A_3$, and $A_4$ represent the amplitudes of the reference beams corresponding to the first, second, third, and fourth frequency components, respectively, of input beam 24; coefficients $B_1$, $B_2$, $B_3$, and $B_4$ represent the amplitudes of background beams corresponding to reference beams $A_1$, $A_2$, $A_3$, and $A_4$, respectively; coefficients $C_1$, $C_2$, $C_3$, and $C_4$ represent the amplitudes of the return measurement beams corresponding to reference beams $A_1$, $A_2$, $A_3$, and $A_4$, respectively; $P_1$ and $P_2$ represent the integrated intensities of the first frequency component in the first and second pulse sequences, respectively, of the input beam 24; and the values for $\epsilon_j$ and $\gamma_j$ are listed in Table 1. The description of the coefficients $\xi_j$, $\zeta_j$, and $\eta_j$ for the quad-homodyne detection method is the same as the corresponding portion of the description given for $\xi_j$, $\zeta_j$, and $\eta_j$ of the bi-homodyne detection method.

It is assumed in Equations (14), (15), (16), and (17) that the ratios of $|A_2|/|A_1|$ and $|A_4|/|A_3|$ are not dependent on j or the value of $P_j$. In order to simplify the representation of $S_j$ so as to project the important features without departing from either the scope or spirit of the present invention, it is also assumed in Equations (14), (15), (16), and (17) that the ratios of the amplitudes of the return measurement beams corresponding to $|A_2|/|A_1|$ and $|A_4|/|A_3|$ are not dependent on j or the value of $P_j$. However, the ratios $|C_2|/|C_1|$ and $|C_4|/|C_3|$ will be different from the ratios $|A_2|/|A_1|$ and $|A_4|/|A_3|$, respectively, when the ratio of the amplitudes of the measurement beam components corresponding to $|A_2|/|A_1|$ and $|A_4|/|A_3|$, respectively, are different from the ratios $|A_2|/|A_1|$ and $|A_4|/|A_3|$, respectively.

Noting that $\cos\phi_{A_2C_2} = \pm\sin\phi_{A_1C_1}$ by the control of the relative phase shifts between corresponding reference and measurement beam components in beam 32, Equations (14), (15), (16), and (17) may be written, respectively, as $$S_1 = P_1 \begin{Bmatrix} \xi_1^2(|A_1|^2 + |A_2|^2) + \zeta_1^2(|B_1|^2 + \\ |B_2|^2) + \eta_1^2(|C_1|^2 + |C_2|^2) + \\ 2\zeta_1\eta_1[|B_1||C_1|\cos\varphi_{B_1C_1\varepsilon_1} + \\ |B_2||C_2|\cos\varphi_{B_2C_2\gamma_1}] + \\ 2\xi_1\eta_1\left[\varepsilon_1|A_1||C_1|\cos\varphi_{A_1C_1} + \\ \gamma_1\left(\frac{|A_2|}{|A_1|}\right)\left(\frac{|C_2|}{|C_1|}\right)|A_1||C_1|\sin\varphi_{A_1C_1}\right] + \\ 2\xi_1\zeta_1[|A_1||B_1|\cos\varphi_{A_1B_1\varepsilon_1} + \\ |A_2||B_2|\cos\varphi_{A_2B_2\gamma_1}] \end{Bmatrix}, \quad (18)$$

$$S_2 = P_1 \left\{ \begin{array}{l} \xi_2^2(|A_3|^2 + |A_4|^2) + \zeta_2^2(|B_3|^2 + \\ |B_4|^2) + \eta_2^2(|C_3|^2 + |C_4|^2) + \\ 2\zeta_2\eta_2[|B_3||C_3|\cos\varphi_{B_3C_3\varepsilon_2} + \\ |B_4||C_4|\cos\varphi_{B_4C_4\gamma_2}] + \\ 2\xi_2\eta_2\left(\frac{|A_3|}{|A_1|}\right)\left(\frac{|C_3|}{|C_1|}\right)\left[\varepsilon_2|A_1||C_1|\cos\varphi_{A_1C_1} + \\ \gamma_2\left(\frac{|A_4|}{|A_3|}\right)\left(\frac{|C_4|}{|C_3|}\right)|A_1||C_1|\sin\varphi_{A_1C_1}\right] + \\ 2\xi_2\zeta_2[|A_3||B_3|\cos\varphi_{A_3B_3\varepsilon_2} + \\ |A_4||B_4|\cos\varphi_{A_4B_4\gamma_2}] \end{array} \right\}, \quad (19)$$

$$S_3 = P_2 \left\{ \begin{array}{l} \xi_1^2(|A_1|^2 + |A_2|^2) + \zeta_1^2(|B_1|^2 + \\ |B_2|^2) + \eta_1^2(|C_1|^2 + |C_2|^2) + \\ 2\zeta_1\eta_1[\varepsilon_1|B_1||C_1|\cos\varphi_{B_1C_1\varepsilon_3} + \\ |B_2||C_2|\cos\varphi_{B_2C_2\gamma_3}] + \\ 2\xi_1\eta_1\left[\varepsilon_3|A_1||C_1|\cos\varphi_{A_1C_1} + \\ \gamma_3\left(\frac{|A_2|}{|A_1|}\right)\left(\frac{|C_2|}{|C_1|}\right)|A_1||C_1|\sin\varphi_{A_1C_1}\right] + \\ 2\xi_1\zeta_1[|A_1||B_1|\cos\varphi_{A_1B_1\varepsilon_3} + \\ |A_2||B_2|\cos\varphi_{A_2B_2\gamma_3}] \end{array} \right\}, \quad (20)$$

$$S_4 = P_2 \left\{ \begin{array}{l} \xi_2^2(|A_3|^2 + |A_4|^2) + \zeta_2^2(|B_3|^2 + \\ |B_4|^2) + \eta_2^2(|C_3|^2 + |C_4|^2) + \\ 2\zeta_2\eta_2[|B_3||C_3|\cos\varphi_{B_3C_3\varepsilon_4} + \\ |B_4||C_4|\cos\varphi_{B_4C_4\gamma_4}] + \\ 2\xi_2\eta_2\left(\frac{|A_3|}{|A_1|}\right)\left(\frac{|C_3|}{|C_1|}\right)\left[\varepsilon_4|A_1||C_1|\cos\varphi_{A_1C_1} + \\ \gamma_4\left(\frac{|A_4|}{|A_3|}\right)\left(\frac{|C_4|}{|C_3|}\right)|A_1||C_1|\sin\varphi_{A_1C_1}\right] + \\ 2\xi_2\zeta_2[|A_3||B_3|\cos\varphi_{A_3B_3\varepsilon_4} + \\ |A_4||B_4|\cos\varphi_{A_4B_4\gamma_4}] \end{array} \right\}, \quad (21)$$

where the relationship $\cos\phi_{A_2C_2} = \sin\phi_{A_1C_1}$ has been used without departing from either the scope or spirit of the present invention.

Information about the conjugated quadratures $|C_1|\cos\phi_{A_1C_1}$ and $|C_1|\sin\phi_{A_1C_1}$ are obtained using the symmetric and antisymmetric properties and orthogonality property of the conjugated quadratures as represented by the following digital filters applied to the signal values $S_j$: $j=1,2,3,4$ $$F_3(S) = \left(\frac{1}{P_1'}\right)\left(\frac{S_1}{\xi_1'^2} - \frac{S_2}{\xi_2'^2}\right) - \left(\frac{1}{P_2'}\right)\left(\frac{S_3}{\xi_1'^2} - \frac{S_4}{\xi_2'^2}\right), \quad (22)$$

$$F_4(S) = \left(\frac{1}{P_1'}\right)\left(\frac{S_1}{\xi_1'^2} - \frac{S_2}{\xi_2'^2}\right) - \left(\frac{1}{P_2'}\right)\left(\frac{S_3}{\xi_1'^2} - \frac{S_4}{\xi_2'^2}\right). \quad (23)$$

The description of $\xi_j'$ and $P_j'$ for the quad-homodyne detection method is the same as the corresponding description given for $\xi_j'$ and $P_j'$ in the bi-homodyne detection method. Using Equations (18), (19), (20), (21), (22), and (23), the following expressions are obtained for the filtered quantities containing components of the conjugated quadratures $|C_1|\cos\phi_{A_1C_1}$ and $|C_1|\sin\phi_{A_1C_1}$:

$$F_3(S) = \left(\frac{P_1}{P_1'} - \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] + \quad (24)$$

$$\left(\frac{P_1}{P_1'} - \frac{P_2}{P_2'}\right)\left[(|B_1|^2 + |B_2|^2)\left(\frac{\zeta_1^2}{\xi_1'^2}\right) - (|B_3|^2 + |B_4|^2)\left(\frac{\zeta_2^2}{\xi_2'^2}\right)\right] +$$

$$\left(\frac{P_1}{P_1'} - \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right] +$$

$$2\left(\frac{P_1}{P_1'} + \frac{P_2}{P_2'}\right)\left[\left(\frac{\xi_1\eta_1}{\xi_1'^2}\right) + \left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1} +$$

$$2\left(\frac{P_1}{P_1'} - \frac{P_2}{P_2'}\right)\left(\frac{|A_2|}{|A_1|}\right)\left(\frac{|C_2|}{|C_1|}\right)\left[\left(\frac{\xi_1\eta_1}{\xi_1'^2}\right) + \right.$$

$$\left.\left(\frac{\xi_2\eta_2}{\xi_2'^2}\right)\left(\frac{|A_4|}{|A_2|}\right)\left(\frac{|C_4|}{|C_2|}\right)\right]|A_1||C_1|\sin\varphi_{A_1C_1} +$$

$$2\left(\frac{P_1}{P_1'}\cos\varphi_{A_1B_1\varepsilon_1} - \frac{P_2}{P_2'}\cos\varphi_{A_1B_1\varepsilon_3}\right)\frac{\xi_1\zeta_1}{\xi_1'^2}|A_1||B_1| -$$

$$2\left(\frac{P_1}{P_1'}\cos\varphi_{A_3B_3\varepsilon_2} - \frac{P_2}{P_2'}\cos\varphi_{A_3B_3\varepsilon_4}\right)\frac{\xi_2\zeta_2}{\xi_2'^2}|A_3||B_3| +$$

$$2\left(\frac{P_1}{P_1'}\cos\varphi_{A_2B_2\gamma_1} - \frac{P_2}{P_2'}\cos\varphi_{A_2B_2\gamma_3}\right)\frac{\xi_1\zeta_1}{\xi_1'^2}|A_2||B_2| -$$

$$2\left(\frac{P_1}{P_1'}\cos\varphi_{A_4B_4\gamma_2} - \frac{P_2}{P_2'}\cos\varphi_{A_4B_4\gamma_4}\right)\frac{\xi_2\zeta_2}{\xi_2'^2}|A_4||B_4| +$$

$$2\left(\frac{P_1}{P_1'}\cos\varphi_{B_1C_1\varepsilon_1} - \frac{P_2}{P_2'}\cos\varphi_{B_1C_1\varepsilon_3}\right)\frac{\xi_1\zeta_1}{\xi_1'^2}|B_1||C_1| -$$

$$2\left(\frac{P_1}{P_1'}\cos\varphi_{B_3C_3\varepsilon_2} - \frac{P_2}{P_2'}\cos\varphi_{B_3C_3\varepsilon_4}\right)\frac{\xi_2\zeta_2}{\xi_2'^2}|B_3||C_3| +$$

$$2\left(\frac{P_1}{P_1'}\cos\varphi_{B_2C_2\gamma_1} - \frac{P_2}{P_2'}\cos\varphi_{B_2C_2\gamma_3}\right)\frac{\xi_1\zeta_1}{\xi_1'^2}|B_2||C_2| -$$

$$2\left(\frac{P_1}{P_1'}\cos\varphi_{B_4C_4\gamma_2} - \frac{P_2}{P_2'}\cos\varphi_{B_4C_4\gamma_4}\right)\frac{\xi_2\zeta_2}{\xi_2'^2}|B_4||C_4|,$$

$$F_4(S) = \left(\frac{P_1}{P_1'} + \frac{P_2}{P_2'}\right)\left[(|A_1|^2 + |A_2|^2)\left(\frac{\xi_1^2}{\xi_1'^2}\right) - (|A_3|^2 + |A_4|^2)\left(\frac{\xi_2^2}{\xi_2'^2}\right)\right] + \quad (25)$$

$$\left(\frac{P_1}{P_1'} + \frac{P_2}{P_2'}\right)\left[(|B_1|^2 + |B_2|^2)\left(\frac{\zeta_1^2}{\xi_1'^2}\right) - (|B_3|^2 + |B_4|^2)\left(\frac{\zeta_2^2}{\xi_2'^2}\right)\right] +$$

$$\left(\frac{P_1}{P_1'} + \frac{P_2}{P_2'}\right)\left[(|C_1|^2 + |C_2|^2)\left(\frac{\eta_1^2}{\xi_1'^2}\right) - (|C_3|^2 + |C_4|^2)\left(\frac{\eta_2^2}{\xi_2'^2}\right)\right] +$$

$$2\left(\frac{P_1}{P_1'} - \frac{P_2}{P_2'}\right)\left[\left(\frac{\xi_1\eta_1}{\xi_1'^2}\right) + \left(\frac{\xi_2\eta_2}{\xi_2'^2}\right)\left(\frac{|A_3|}{|A_1|}\right)\left(\frac{|C_3|}{|C_1|}\right)\right]|A_1||C_1|\cos\varphi_{A_1C_1} +$$

$$2\left(\frac{P_1}{P_1'} + \frac{P_2}{P_2'}\right)\left(\frac{|A_2|}{|A_1|}\right)\left(\frac{|C_2|}{|C_1|}\right)\left[\left(\frac{\xi_1\eta_1}{\xi_1'^2}\right) + \right.$$

$$\left.\left(\frac{\xi_2\eta_2}{\xi_2'^2}\right)\left(\frac{|A_4|}{|A_2|}\right)\left(\frac{|C_4|}{|C_2|}\right)\right]|A_1||C_1|\sin\varphi_{A_1C_1} +$$

$$2\left(\frac{P_1}{P_1'}\cos\varphi_{A_1B_1\varepsilon_1} + \frac{P_2}{P_2'}\cos\varphi_{A_1B_1\varepsilon_3}\right)\frac{\xi_1\zeta_1}{\xi_1'^2}$$

$$|A_1||B_1| - 2\left(\frac{P_1}{P_1'}\cos\varphi_{A_3B_3\varepsilon_2} + \frac{P_2}{P_2'}\cos\varphi_{A_3B_3\varepsilon_4}\right)\frac{\xi_2\zeta_2}{\xi_2'^2}$$

$$|A_3||B_3| + 2\left(\frac{P_1}{P_1'}\cos\varphi_{A_2B_2\gamma_1} + \frac{P_2}{P_2'}\cos\varphi_{A_2B_2\gamma_3}\right)$$

$$\frac{\xi_1\zeta_1}{\xi_1'^2}|A_2||B_2| - 2\left(\frac{P_1}{P_1'}\cos\varphi_{A_4B_4\gamma_2} + \frac{P_2}{P_2'}\cos\varphi_{A_4B_4\gamma_4}\right)$$

$$\frac{\xi_2\zeta_2}{\xi_2'^2}|A_4||B_4| + 2\left(\frac{P_1}{P_1'}\cos\varphi_{B_1C_1\varepsilon_1} + \frac{P_2}{P_2'}\cos\varphi_{B_1C_1\varepsilon_3}\right)$$

-continued $$\frac{\xi_1\zeta_1}{\xi_1'^2}|B_1||C_1| - 2\left(\frac{P_1}{P_1'}\cos\varphi_{B_3C_3\varepsilon_2} + \frac{P_2}{P_2'}\cos\varphi_{B_3C_3\varepsilon_4}\right)$$

$$\frac{\xi_2\zeta_2}{\xi_2'^2}|B_3||C_3| + 2\left(\frac{P_1}{P_1'}\cos\varphi_{B_2C_2\gamma_1} - \frac{P_2}{P_2'}\cos\varphi_{B_2C_2\gamma_3}\right)$$

$$\frac{\xi_1\zeta_1}{\xi_1'^2}|B_2||C_2| - 2\left(\frac{P_1}{P_1'}\cos\varphi_{B_4C_4\gamma_2} - \frac{P_2}{P_2'}\cos\varphi_{B_4C_4\gamma_4}\right)\frac{\xi_2\zeta_2}{\xi_2'^2}|B_4||C_4|.$$

The parameters $$\left[\left(\frac{|A_2|}{|A_1|}\right)\left(\frac{|C_2|}{|C_1|}\right)\right], \tag{26}$$

$$\left(\frac{|A_4|}{|A_2|}\right)\left(\frac{|C_4|}{|C_2|}\right), \tag{27}$$

$$\left[\left(\frac{|A_3|}{|A_1|}\right)\left(\frac{|C_3|}{|C_1|}\right)\right] \tag{28}$$

need to be determined in order to complete the determination of a conjugated quadratures for certain end use applications. The parameters given by Equations (26), (27), and (28) can for example be measured by procedures analogous to the procedure described for the bi-homodyne detection method with respect to measuring the quantity specified by Equation (9).

The remaining description of the quad-homodyne detection method is the same as corresponding portion of the description given for the bi-homodyne detection method.

It is also evident that since the conjugated quadratures of fields are obtained jointly when using the quad-homodyne detection, there is a significant reduction in the potential for an error in tracking phase as a result of a phase redundancy unlike the situation possible in single-homodyne detection of conjugated quadratures of fields.

There are a number of advantages of the quad-homodyne detection as a consequence of the conjugated quadratures of fields being jointly acquired quantities.

One advantage is a reduced sensitivity the effects of an overlay error of a spot in or on the substrate that is being imaged and a conjugate image of a pixel of a conjugate set of pixels of a multi-pixel detector during the acquisition of the four electrical interference signal values of each spot in and/or on a substrate imaged using interferometric confocal microscopy. Overlay errors are errors in the set of four conjugate images of a respective set of conjugate detector pixels relative to the spot being imaged.

Another advantage is that when operating in the scanning mode there is reduced sensitivity to effects of pulse-to-pulse variations of a respective conjugate set of pulses of the input beam 24 to the interferometer system.

Another advantage is that when operating in the scanning mode there is an increase in through-put since only one pulse of the source is required to generate the at least four electrical interference values.

Figure 2A:
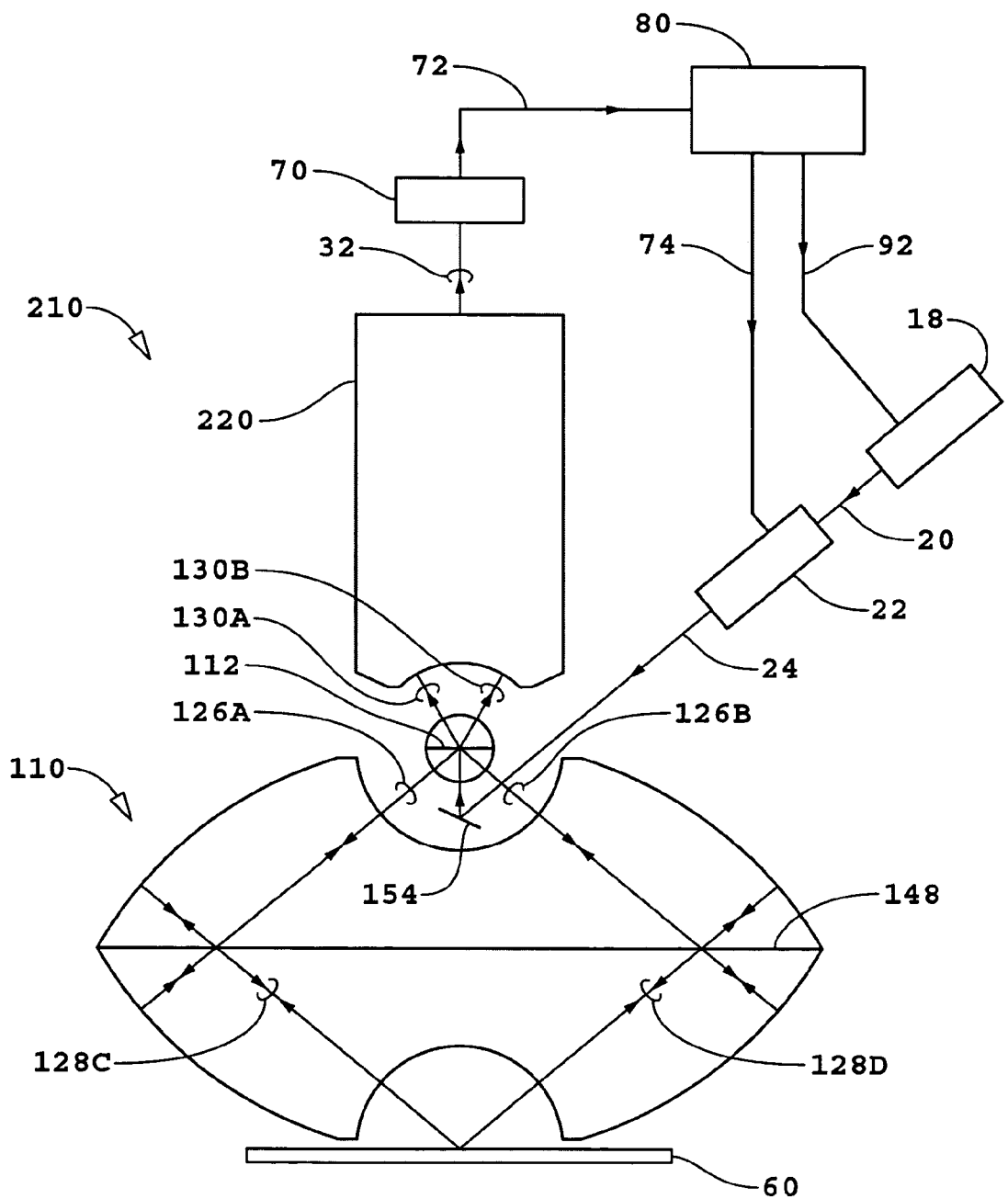
FIG. 2a is a schematic diagram of a confocal microscope system.

A first embodiment comprises the interferometer system of FIGS. 1a–1c with interferometer 10 of the first embodiment that is shown schematically in FIG. 2a. Interferometer 10 comprises an interferometer such as described in commonly owned U.S. Provisional Patent Application filed No. 60/447,254 (ZI-40) entitled "Transverse Differential Interferometric Confocal Microscopy" and U.S. patent application Ser. No. 10/778,371, filed Feb. 13, 2004 (ZI-40) also entitled "Transverse Differential Interferometric Confocal Microscopy" both of which are by Henry A. Hill. The contents of the U.S. Provisional Patent Application and the U.S. Patent Application are herein incorporated in their entirety by reference.

Interferometer 10 of the first embodiment comprises a first imaging system generally indicated as numeral 110, pinhole array beam-splitter 112, detector 70, and a second imaging system generally indicated as numeral 210. The second imaging system 210 is low power microscope having a large working distance, e.g. Nikon ELWD and SLWD objectives and Olympus LWD, ULWD, and ELWD objectives. The first imaging system 110 comprises an interferometric confocal microscopy system described in part in commonly owned U.S. Provisional Application No. 60/442,982 (ZI-45) entitled "Interferometric Confocal Microscopy Incorporating Pinhole Array Beam-Splitter" and U.S. patent application Ser. No. 10/765,229, filed Jan. 27, 2004 (ZI-45) and also entitled "Interferometric Confocal Microscopy Incorporating Pinhole Array Beam-Splitter" both of which are by Henry A. Hill. The contents of both of the U.S. Provisional Patent Application and the U.S. Patent Application are herein incorporated in their entirety by reference.

Figure 2B:
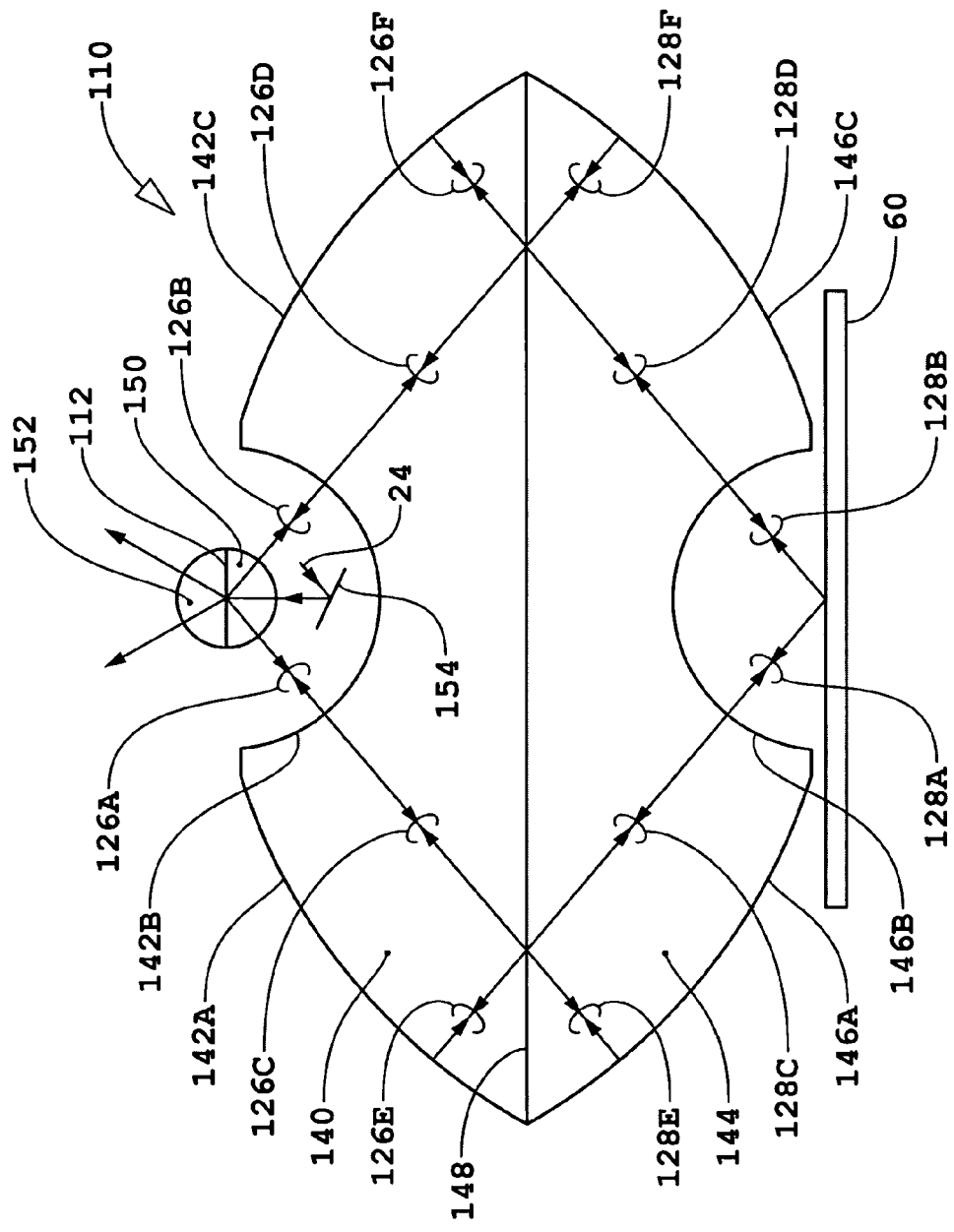
FIG. 2b is a schematic diagram of catadioptric imaging system.

First imaging system 110 is shown schematically in FIG. 2b. The imaging system 110 is a catadioptric system such as described in commonly owned U.S. Pat. No. 6,552,852 B2 (ZI-38) entitled "Catoptric and Catadioptric Imaging System" and commonly owned U.S. patent application Ser. No. 10/366,651 (ZI-43) entitled "Catoptric And Catadioptric Imaging Systems" wherein both of the patent applications are by Henry A. Hill, the contents of the two cited patent applications incorporated herein in their entirety by reference.

Catadioptric imaging system 110 comprises catadioptric elements 140 and 144, beam-splitter 148, and convex lens 150. Surfaces 142B and 146B are concave spherical surfaces with nominally the same radii of curvature and the centers of curvature of surfaces 142B and 146B are conjugate points with respect to beam-splitter 148. Surfaces 142A and 142C are convex spherical surfaces that have the same centers of curvature and surfaces 146A and 146C are convex spherical surfaces that have the same centers of curvature. Surfaces 142A, 142C, 146A, and 146C nominally have the same radii of curvature. The centers of curvature of surfaces 142A and 142C are shifted by a small displacements $(0,0,z_1')$ with respect to beam-splitter 148 or equivalently to the centers of curvature of surfaces 146B and surfaces 146A and 146C are shifted by a small displacements $(0,0,-z_2')$ with respect to the centers of curvature of surfaces 142B. Relative displacements $(0,0,z_1')$ and $(0,0,z_2')$ are selected to optimize the performance of interferometer 10 with respect to acquisition of information about substrate 60. The center of curvature of convex lens 150 is the same as the center of curvature of surfaces 142B. The radius of curvature of surface 146B is selected so as to minimize the loss in usable solid angle of the imaging system 110 and to produce a working distance for imaging system 110 acceptable for an end use application, e.g., of the order of a mm. The radius of curvature of convex lens 150 is selected so that off-axis aberrations of the catadioptric imaging system 110 are compensated. The medium of elements 140 and 144 may be for example $CaF_2$, fused silica or commercially available glass such as SF11. The medium of convex lens 150 may be for example $CaF_2$, fused silica, YAG, or commercially available glass such as SF11. An important consideration in the selection of the media of elements 140 and 144 and convex lens 150 will be transmission properties for the frequencies of beam 24.

Note that as a result of the small displacements just mentioned, the conjugate of the center of curvature of surface 142A, as seen through beam splitter 148, does not coincide with the center of curvature of surface 146A. (Or, equivalently, the conjugate of the center of curvature of surface 146A, as seen through beam splitter 148, does not coincide with the center of curvature of surface 142A.) Rather, those two points are displaced by an amount determined by the small displacement of the two surfaces 142A and 146A relative to each other. The direction of their displacement relative to each other is normal to the plane of beam splitter 148.

Figure 2C:
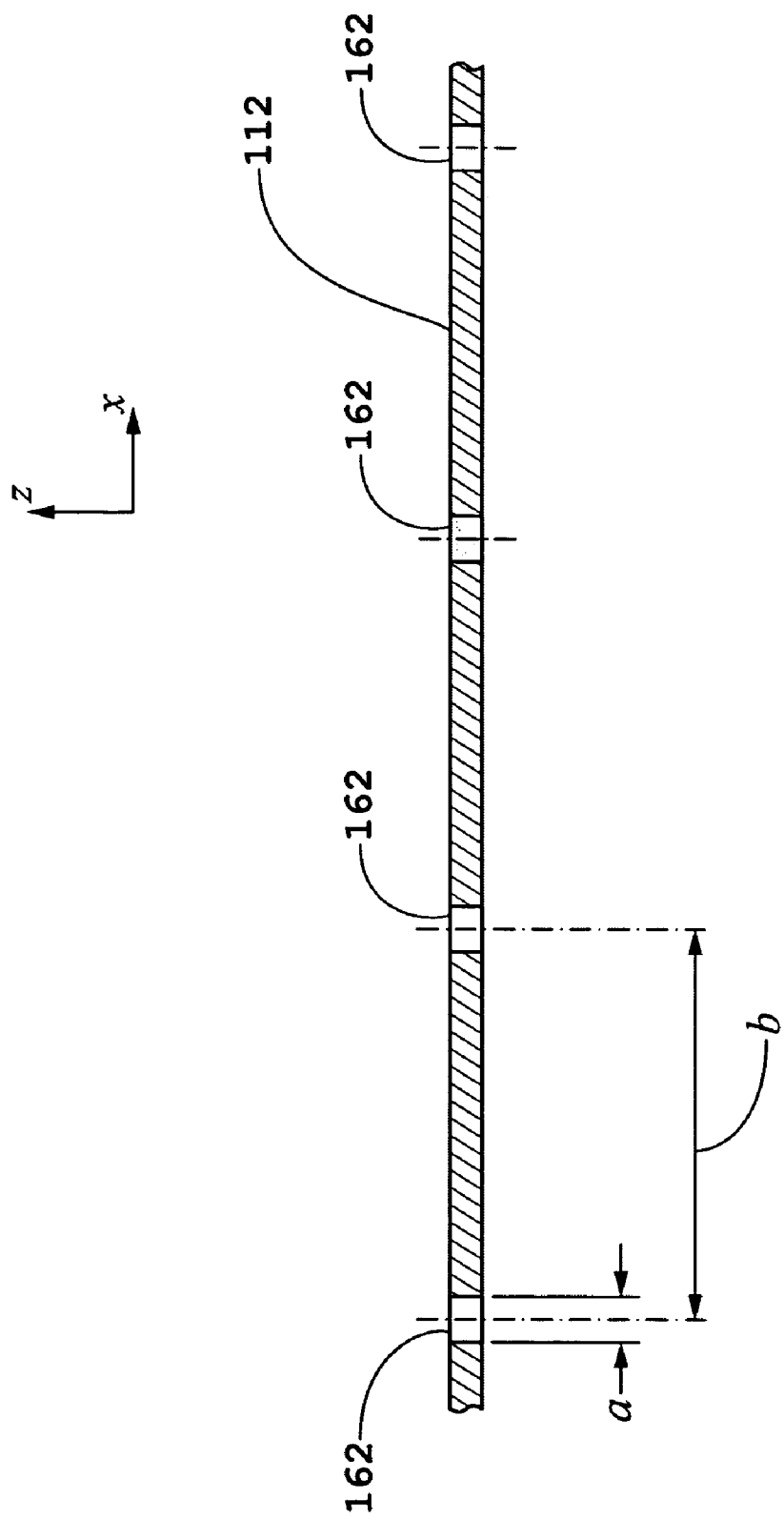
FIG. 2c is a schematic diagram of beams focused to spots at a pinhole array used in a confocal microscope system.

Convex lens 152 has a center of curvature the same as the center of curvature of convex lens 150. Convex lenses 150 and 152 are bonded together with pinhole beam-splitter 112 in between. Pinhole array beam-splitter 112 is shown in FIG. 2c. The pattern of pinholes in pinhole array beam-splitter is chosen to match the requirements of an end use application. An example of a pattern is a two dimensional array of equally spaced pinholes in two orthogonal directions. The pinholes may comprise circular apertures, rectangular apertures, or combinations thereof such as described in commonly owned U.S. patent application Ser. No. 09/917,402 (ZI-15) entitled "Multiple-Source Arrays for Confocal and Near-field Microscopy" by Henry A. Hill and Kyle Ferrio of which the contents thereof are incorporated herein in their entirety by reference. The spacing between pinholes of pinhole array beam-splitter 112 is shown in FIG. 2c as b with aperture size a.

Input beam 24 is reflected by mirror 54 to pinhole beam-splitter 112 where a first portion thereof is transmitted as reference beam components of output beam components 130A and 130B (see FIG. 2a) and a second portion thereof scattered as measurement beam components of beam components 126A and 126B. The measurement beam components of beam components 126A and 126B are imaged as measurement beam components of beam components 128A and 128B to an array of image spots in image planes displaced from the surface of substrate 60.

Figure 2D:
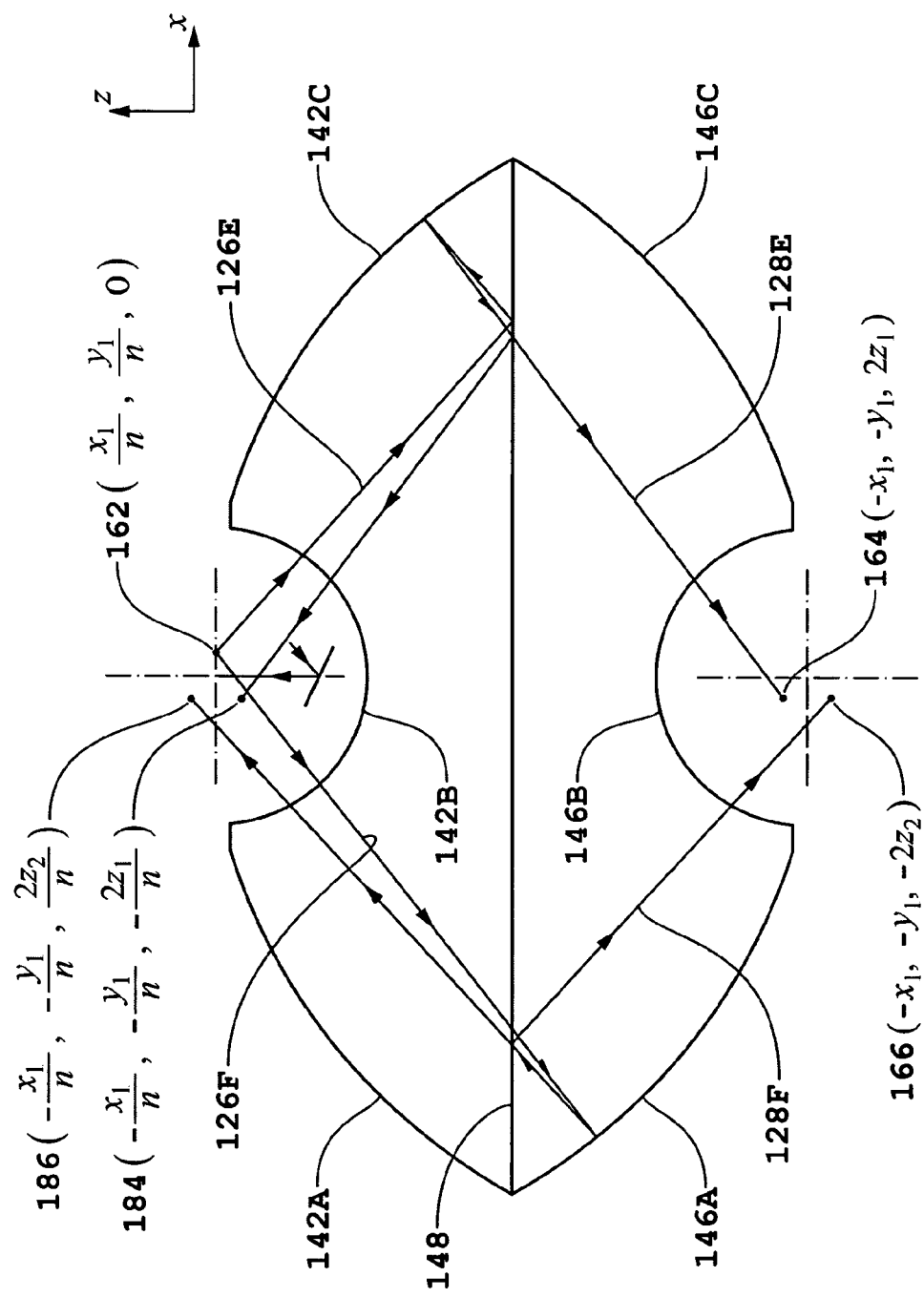
FIG. 2d is a schematic diagram of beams focused to spots in a catadioptric imaging system.
Figure 2E:
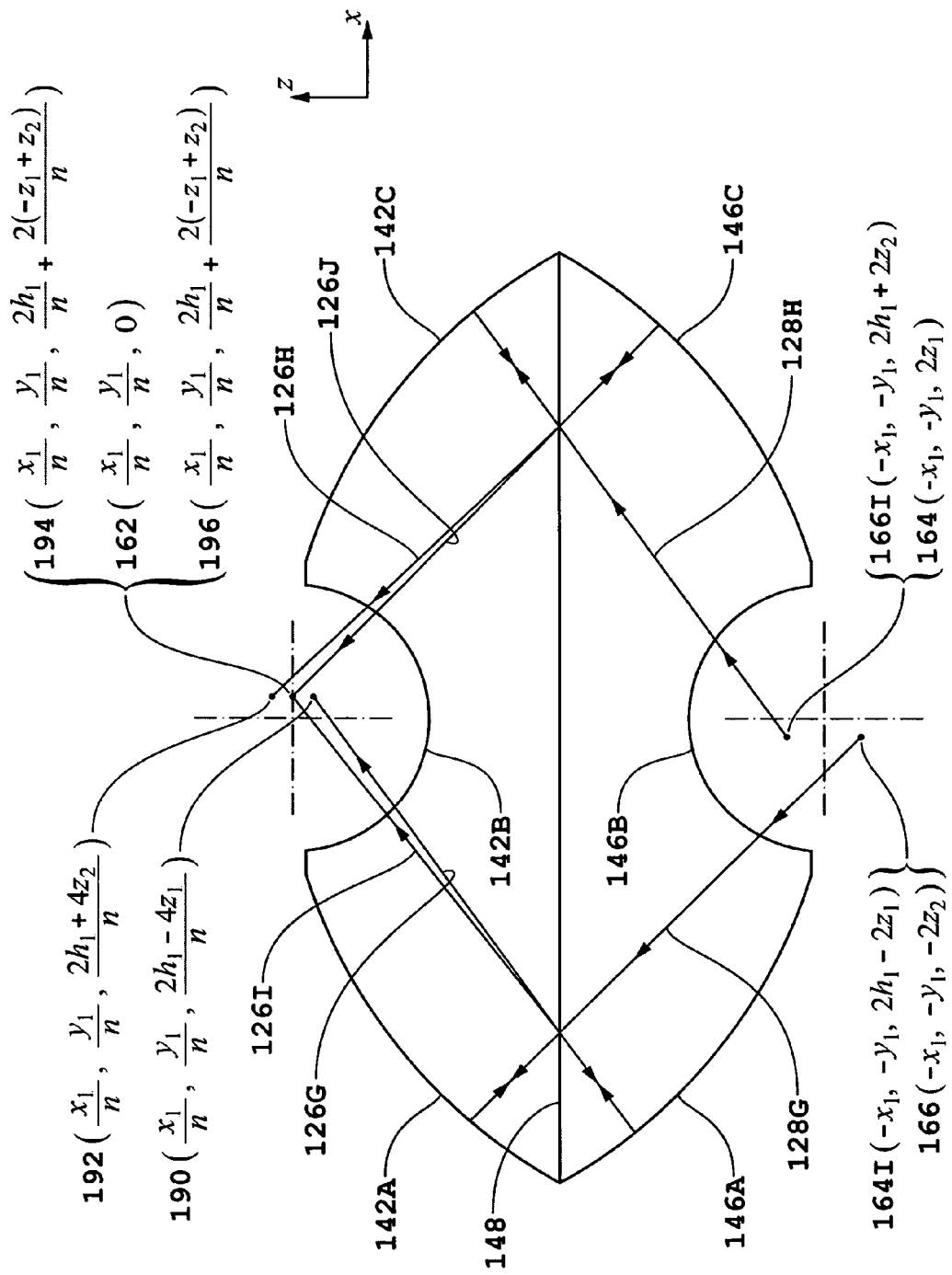
FIG. 2e is a schematic diagram of beams focused to spots in a catadioptric imaging system.

The arrays of image spots in the image planes displaced from the surface of substrate 60 comprises a first and second array of image spots with the second array of image spots transversely and longitudinally displaced with respect to the first array of image spots. The locations of a corresponding pair of spots 164 and 166 of the first and second arrays of image spots are shown diagrammatically in FIGS. 2d and 2e for the case where the displacements $z_1'=z_2'$ of convex surfaces 142A, 142C, 146A, and 146C. The corresponding pair of spots 164 and 166 are images of a pinhole 162 in of pinhole array beam-splitter 112. The displacement of center of curvature of surface 142A is in the positive z direction. An example of a path of a beam contributing to image spot 164 is beam 126E and an example of a path of a beam contributing to image spot 166 is beam 126F (see FIG. 2d).

A portion of beam 126E is also reflected twice by beam-splitter 148 and once by convex surfaces 142A and 142C to form an image spot 184 (see FIG. 2d) at location $(-x_1/n, -y_1/n, -2z_1/n)$ of pinhole 162 where $x_1$ and $y_1$ are the x and y coordinates, respectively, of pinhole 162 in the plane of pinhole array beam-splitter 112 and n is the index of refraction of convex lenses 150 and 152. In addition, a portion of beam 126F is transmitted twice by beam-splitter 148 and reflected once by convex surfaces 146A to form an image spot 186 (see FIG. 2d) at location $(-x_1/n, -y_1/n, 2z_2/n)$. The locations of image spots 184 and 186 are arranged to be half way between pinholes of pinhole array beam-splitter 112 by selecting the location of pinhole 162 relative to the location of the center of curvatures of lenses 150 and 152 to be either b/4 mod b or (3/4)b mod b.

Next consider the affects of catadioptric imaging system 110 on reflected portions of the beams comprising image spots 164 and 166 by the surface of substrate 60. The reflected portions are part of the return measurement beam components of beams 128A and 128B and imaged by catadioptric imaging system 110 to four spots 190, 192, 194, and 196 in the space of pinhole array beam-splitter 112 (see FIG. 2e). The locations of the respective spots with respect to the pinhole source of beams 126E and 126F are $[x_1, y_1, (2h_1-4z_1)/n]$, $[x_1, y_1, (2h_1+4z_2)/n]$, $[x_1/n, y_1/n, 2(h_1-z_1+z_2)/n]$, and $[x_1/n, y_1/n, 2(h_1-z_1+z_2)/n]$ where $2z_1-h_1$ and $-2z_2+h_1$ are the displacements of spots 164 and 166 from the surface of substrate 60, respectively.

Portions of the beams forming image spots 190, 192, 194, and 196 are transmitted by the pinhole corresponding to pinhole source of beams 126E and 126F as a component of beam components 130A and 130B. The beams forming image spots 184 and 186 are not transmitted by the pinhole corresponding to the pinhole source of beams 126E and 126F or by other pinholes of pinhole array beam-splitter 112 because of the displacements of image spots 184 and 186 with respect to the pinhole corresponding to pinhole source of beams 126E and 126F and because of the displacement relative to other pinholes that is generated as a result of the selection of the pinhole locations of pinhole array beam-splitter 112 relative to the center of curvatures of lenses 150 and 152 to be either b/4 mod b or (3/4)b mod b. To further reduce the effects of spurious beams generated by reflection of portions of the beams forming image spots 184 and 186 by pinhole array beam-splitter 112, the respective surface of pinhole array beam-splitter 112 is coated with an anti-reflective coating.

The effects of spurious beams generated by reflection of portions of the beams forming image spots 184 and 186 by pinhole array beam-splitter 112 are further reduced since the array of image spots 184, 186, 190, 192, 194, and 196 form only two superimposed images on the x-y plane.

The description of the affects of catadioptric imaging system 110 on portions of the beams comprising image spots 164 and 166 that are scattered by sub-wavelength artifacts and/or defects on the surface of substrate 60 is based on an analysis that is a variant of the analysis forming the basis of the description given for the affects of catadioptric imaging system 110 on the portions of the beams comprising image spots 164 and 166 that are reflected by the surface of substrate 60.

The next step is the imaging of output beam components 130A and 130B by imaging system 210 to an array of spots that coincide with the pixels of a multi-pixel detector 70 such as a CCD to generate an array of electrical interference signals 72. The array of electrical interference signals is transmitted to signal processor and controller 80 for subsequent processing for an array of conjugated quadratures.

The description of input beam 24 is the same as corresponding portions of the description given for input beam 24 of FIG. 1a with beam-conditioner 22 configured as a two-frequency generator and frequency-shifter shown in FIG. 1c. Input beam 24 comprises two components that have different frequencies and have the same state of plane polarization. The frequency of each component of input beam 24 is shifted between different frequency values by beam-conditioner 22 according to control signal 74 generated by electronic processor and controller 80. Beam 20 comprises single frequency component.

The conjugated quadratures of fields of the return measurement beams are obtained using the bi-homodyne detection method wherein sets of four measurements of the electrical interference signals 72 are made. An array of conjugated quadratures of fields is measured interferometrically by interferometer confocal imaging system 10 wherein each conjugated quadratures comprises a difference of conjugated quadratures of fields of beams scattered/reflected from a pair of spots in or on a substrate. The array of conjugated quadratures is measured jointly, i.e., simultaneously, and the components of each conjugated quadratures are measured jointly.

The relative phases of the beams subsequently scattered/reflected by the pair of spots in or on a substrate are adjusted by the control of interferometer system parameters, e.g., the relative optical path lengths of measurement and return measurement beam components corresponding to respective spots of the pairs of spots in or on substrate 60. The relative phases are adjusted by making changes in the radii of curvature of convex surfaces 142A, 142C, 146A, and 146C without introducing changes in the respective centers of curvature. An example of a technique to introduce a change in a radii of curvature of the convex surfaces of 142A, 142C, 146A, and 146C is to add uniform layers to the respective surfaces comprising an index of refraction matching material. Another example of a technique to introduce a change in relative phase is to add a concave reflecting surface next to a convex surface with an air gap such that the air gap thickness may be adjusted. In the latter example, the convex would be anti-reflective coated.

The measured conjugate quadratures in the first embodiment are proportional to components of complex amplitude $V_3(h_1,z_1,h_2,z_2,\chi_1,\chi_2,\chi_3,\chi_4)$ that can to a good approximation be written as $$V_3(h_1, z_1, h_2, z_2, \chi_1, \chi_2, \chi_3, \chi_4) = \tag{29}$$

$$R_1^{1/2} e^{-i2\beta_0 h_1} \times \begin{pmatrix} j_0[2\alpha_0(h_1 - 2z_1)]e^{i4\beta_0 z_1 + i(\chi_1+\chi_2)} + \\ j_0[2\alpha_0(h_1 - 2z_2)]e^{-i4\beta_0 z_2 + i(\chi_3+\chi_4)} + \\ j_0\{2\alpha_0[h_1 + (z_1 - z_2)]\}e^{i2\beta_0(z_1-z_2)+i(\chi_1+\chi_4)} + \\ j_0\{2\alpha_0[h_1 + (z_1 - z_2)]\}e^{i2\beta_0(z_1-z_2)+i(\chi_2+\chi_3)} \end{pmatrix} -$$

$$R_1^{1/2} e^{-i2\beta_1 h_1} \left(\frac{1-\cos\theta_1}{1-\cos\theta_0}\right)^{1/2} \times$$

$$\begin{pmatrix} j_0[2\alpha_1(h_1 - 2z_1)]e^{i4\beta_1 z_1 + i(\chi_1+\chi_2)} + \\ j_0[2\alpha_1(h_1 - 2z_2)]e^{-i4\beta_1 z_2 - i(\chi_3+\chi_4)} + \\ j_0\{2\alpha_0[h_1 + (z_1 - z_2)]\}e^{i2\beta_1(z_1-z_2)+i(\chi_1+\chi_4)} + \\ j_0\{2\alpha_1[h_1 + (z_1 - z_2)]\}e^{+i2\beta_1(z_1-z_2)+i(\chi_2+\chi_3)} \end{pmatrix}$$

where $R_1^{1/2}$ is the complex reflectivity coefficient of the surface of substrate 60 for the fields of the beams forming spots 164 and 166; $\chi_1$, $\chi_2$, $\chi_3$, and $\chi_4$ are the phase shifts introduced by changing the radii of curvature of convex surfaces 142A, 142C, 146A, and 146C, respectively, while maintaining the respective centers of curvatures constant;

$$\alpha_0 = k(1 - \cos\theta_0); \tag{30}$$

$$\alpha_1 = k(1 - \cos\theta_1); \tag{31}$$

$$\beta_0 = k(1 + \cos\theta_0); \tag{32}$$

$$\beta_1 = k(1 + \cos\theta_1); \tag{33}$$

$j_p(x)$ is the spherical Bessel function of order $p=0,1,2,\ldots$; and $\sin\theta_0$ and $\sin\theta_1$ are the numerical apertures, respectively, of the imaging system without an occulting aperture and of the occulted aperture in the image space of substrate 60. Descriptions of derivations that form the basis for the two terms in Equation (29) may be found in references such as the book edited by T. Wilson, *Confocal Microscopy*, Academic Press (1990), the contents of which are herein incorporated in their entirety by reference.

The form in which Equation (29) is written reflects certain important aspects of the first embodiment: the pinhole sources for each of the beams forming spots 164 and 166 (see FIG. 2*d*) are the same pinhole of pinhole array beam-splitter 112, the pinholes performing the confocal spatial filtering of the beams forming spots 190, 192, 194, and 196 are the same pinhole of pinhole array beam-splitter 112 (see FIGS. 2*c* and 2*e*), and the portions of the beams forming spots 190, 192, 194, and 196 subsequently spatially filtered, i.e., transmitted, by the same pinhole are detected by the same pixel of detector 70.

In the first embodiment, phases $\chi_1$, $\chi_2$, $\chi_3$, and $\chi_4$ are selected such that beams 194 and 196 are out of phase by $\pi$ and thus destructively interfere with each other. Corresponding conditions placed on phases $\chi_1$, $\chi_2$, $\chi_3$, and $\chi_4$ are $$(\chi_1+\chi_4)-(\chi_2+\chi_3)=\pm\pi,\pm 3\pi,\pm 5\pi,\ldots, \tag{34}$$

With a non-limiting assumptions that $y_1=0$, and $z_1=z_2$, Equation (29) assumes the form $$V_3(h_1, z_1, h_1, z_1, \chi_1, \chi_2, \chi_3, \chi_4) = \tag{35}$$

$$R_1^{1/2} e^{-i2\beta_0 h_1} \times \left\{ \begin{matrix} j_0[2\alpha_0(h_1 - 2z_1)]e^{i4\beta_0 z_1 + i(\chi_1+\chi_2)} + \\ j_0[2\alpha_0(h_1 + 2z_1)]e^{i4\beta_0 z_1 + i(\chi_3+\chi_4)} \end{matrix} \right\} - R_1^{1/2}$$

$$e^{-i2\beta_1 h_1}\left(\frac{1-\cos\theta_1}{1-\cos\theta_0}\right)^{1/2} \times \left\{ \begin{matrix} j_0[2\alpha_1(h_1 - 2z_1)]e^{i4\beta_1 z_1 + i(\chi_1+\chi_2)} + \\ j_0[2\alpha_1(h_1 + 2z_1)]e^{-i4\beta_1 z_1 + i(\chi_3+\chi_4)} \end{matrix} \right\}.$$

The first embodiment is further configured to operate in the dark field mode when $h_1 \cong 0$. The dark field requirement is achieved by placing a second condition on the phases $\chi_1$, $\chi_2$, $\chi_3$, and $\chi_4$ in conjunction with a condition on $z_1$. The second condition is $$(\chi_1+\chi_2)-(\chi_3+\chi_4)=0,\pm 2\pi,\pm 4\pi,\ldots. \tag{36}$$

The two conditions on phases $\chi_1$, $\chi_2$, $\chi_3$, and $\chi_4$ represented by Equations (34) and (36) are combined to obtain relationships between pair of phases $\chi_1$, $\chi_2$, $\chi_3$, and $\chi_4$, e.g., $$\chi_1 - \chi_3 = \pm\frac{\pi}{2} + p2\pi, |p| = 0, 1, 2, \ldots, \tag{37}$$

$$\chi_2 - \chi_4 = \mp\frac{\pi}{2} + q2\pi, |q| = 0, 1, 2, \ldots \tag{38}$$

For the conditions $$\chi_1 - \chi_3 = \frac{\pi}{2} \text{ and } \chi_2 - \chi_4 = -\frac{\pi}{2},$$

Equation (35) reduces to $$V_3(h_1, z_1, h_1, z_1, \chi_1, \chi_2, \chi_1 - \pi/2, \chi_2 + \pi/2) = \quad (39)$$
$$R_1^{1/2} e^{-i2\beta_0 h_1} e^{i(\chi_1 + \chi_2)} \times$$
$$\left\{ \begin{array}{l} j_0[2\alpha_0(h_1 - 2z_1)] e^{i4\beta_0 z_1} + \\ j_0[2\alpha_0(h_1 + 2z_1)] e^{-i4\beta_0 z_1} \end{array} \right\} -$$
$$R_1^{1/2} e^{-i2\beta_1 h_1} \left( \frac{1 - \cos\theta_1}{1 - \cos\theta_0} \right)^{1/2} e^{i(\chi_1 + \chi_2)} \times$$
$$\left\{ \begin{array}{l} j_0[2\alpha_1(h_1 - 2z_1)] e^{i4\beta_1 z_1} + \\ j_0[2\alpha_1(h_1 + 2z_1)] e^{-i4\beta_1 z_1} \end{array} \right\}.$$

Using a contracted notation of $V_3(h_1,z_1,h_1,z_1,\chi_1,\chi_2,\chi_1-\pi/2,\chi_2+\pi/2) = V_3(h_1,z_1)$ and making a power series expansion of Equation (39) in $h_1$, we have $$V_3(h_1, z_1) = 2R_1^{1/2} e^{i(\chi_1 + \chi_2)} \times \quad (40)$$
$$\left[ j_0(4\alpha_0 z_1)\cos 4\beta_0 z_1 - \left( \frac{1 - \cos\theta_1}{1 - \cos\theta_0} \right)^{1/2} \right.$$
$$\left. j_0(4\alpha_1 z_1)\cos 4\beta_1 z_1 \right] + i2R_1^{1/2} e^{i(\chi_1 + \chi_2)} \times$$
$$\left[ j_1(4\alpha_0 z_1)\sin 4\beta_0 z_1 - \left( \frac{1 - \cos\theta_1}{1 - \cos\theta_0} \right)^{1/2} \right.$$
$$\left. \frac{\alpha_1}{\alpha_0} j_1(4\alpha_1 z_1)\sin 4\beta_1 z_1 \right] 2\alpha_0 h_1 -$$
$$i2R_1^{1/2} e^{i(\chi_1 + \chi_2)} \times$$
$$\left[ j_0(4\alpha_0 z_1)\cos 4\beta_0 z_1 - \left( \frac{1 - \cos\theta_1}{1 - \cos\theta_0} \right)^{1/2} \right.$$
$$\left. \frac{\beta_1}{\beta_0} j_0(4\alpha_1 z_1)\cos 4\beta_1 z_1 \right] 2\beta_0 h_1 + \ldots$$

The dark field mode of operation of the first embodiment is achieved by selecting a value of $z_1$ such that the constant term in Equation (40) is zero. The selected values for $z_1$ are solutions of the transcendental equation $$j_0(4\alpha_0 z_1)\cos 4\beta_0 z_1 = \left( \frac{1 - \cos\theta_1}{1 - \cos\theta_0} \right)^{1/2} j_1(4\alpha_1 z_1)\cos 4\beta_1 z_1. \quad (41)$$

A set of solutions of the transcendental equation $\alpha_0 z_{1,m}$, m=1,2, and 3, for the example of $\theta_0=60$ degrees and $\theta_1=15$ degrees is listed in Table 2. Also listed in Table 2 are the corresponding sizes $D_m$, full width at half maximum, of the common spots relative to the diffraction-limited resolution $\lambda/2NA$ of the interferometric confocal imaging system.

When the transcendental equation of Equation (41) is satisfied, fields of beams 194 and 196 at pinhole array beam-splitter 112 are equal in magnitude and have opposite phases. There will be out-of-phase spurious beams generated that are out of phase by 180 degrees as a result of the destructive interference of fields of beams 194 and 196. It is apparent that a portion of the out of phase spurious beams will generate out-of-phase secondary spurious beams that are focused to spots near pinhole 162 in an manner analogous to the generation of spots 190, 192, 194, and 196. The amplitudes of the effects of the secondary spurious beams will be less than or of the order of 5% of the amplitudes of the portions of the beams forming spots 190 and 192 transmitted by the corresponding pinhole in pinhole array 112 and will in first order effect the level of the dark field and only in second order the sensitivity to height measurements.

The important feature of Equation (40) is that the definition of the height of the surface of substrate 60 corresponds to a vertical position of substrate 60 such that $V_3(h_1,z_1)=0$, i.e., such that values of the corresponding conjugated quadratures is zero. The coefficients of $h_1$ in Equation (40) may be measured as a function of properties of materials. Corresponding values of the coefficients of $h_1$ in Equation (40) are listed in Table 2 as $\partial V_3(h_1,z_{1,m})/\partial h_1$. The first embodiment may be operated in a scanning mode and measured arrays of conjugated quadratures

TABLE 2

| m | $\alpha_0 z_{1,m}$ | $\frac{2z_{1,m}}{\lambda}$ | $\frac{\partial V_3(h_1, z_{1,m})}{\partial h_1} \left( \frac{1}{iR_1^{1/2}} \right)$ | $\frac{D_m}{\left( \frac{\lambda}{2NA} \right)}$ |
|---|---|---|---|---|
| 1 | 0.2628 | 0.0837 | 0.690 | 1.119 |
| 2 | 0.8252 | 0.2627 | −1.216 | 1.867 |
| 3 | 1.3424 | 0.4273 | 0.849 | 2.752 | may be converted to a height profile by using the measured properties of the coefficients of $h_1$, i.e., it is not necessary to scan in $h_1$ in order to determine the height of the surface relative to a reference frame.

It is important to note that the use of the m=1 solution listed in Table 2 in an end use application will permit the examination of substrate 60 essentially with a diffraction-limited resolution. This feature of the first embodiment represents an important advantage. Alternatively, the use of the m=2 solution in Table 2 in an end use application will permit the examination of substrate 60 with an increase in sensitivity of approximately 1.8 compared to the sensitivity of the m=1 solution but at the expense of lateral spatial resolution.

Operation in a dark field mode leads to both reduced systematic and statistical errors in the information represented by the arrays of conjugated quadratures and increased throughput. The information may comprise the transverse derivative of a profile of one or more surfaces of substrate 60 in or on substrate 60; one-dimensional, two-dimensional, and three-dimensional transverse differential images of substrate 60; critical dimensions of features or artifacts on or in substrate 60, and the sizes and locations of sub-wavelength defects in or on substrate 60.

The background components of return measurement beams generated by scattering/reflection of measurement beam components by conjugate spots are the same and therefore do not contribute to the electrical interference signals 72. Accordingly, the background components do not contribute to either the average values of the electrical interference signals 72 or to interference terms in electrical interference signals 72 for both the first and second embodiments.

The reduction of statistical error is also a direct consequence of operation in the dark field mode. The contributions of background fields are removed/eliminated in the second embodiment by the superposition of background fields arranged to have the same amplitudes and phase differences of $\pi$ and not by the subtraction of intensities. As a result of the dark field, the intensity of beam 24 can be increased significantly without saturation of detector 70 and a corresponding reduction in statistical error is achieved.

The increase in throughput is a direct consequence of operating in a dark field mode. The time required to achieve a certain precision in the measured array of conjugated quadratures is reduced by an increase of the intensity of beam 24 that is permitted by operating in the dark field mode. As a result of the dark field, the intensity of beam 24 can be increased significantly without saturation of detector 70.

Also when operating in a dark field mode, a measured conjugated quadratures of fields corresponding to a pair of spots comprising a sub-wavelength artifact in a locally isotropic section of substrate 60 represents information about the sub-wavelength artifact relative to a reference sub-wavelength artifact. The reference sub-wavelength artifact has properties of the locally isotropic section and dimensions similar to those of the artifact. Accordingly, properties measured include information about critical dimensions and location of the sub-wavelength artifact in or on substrate 60.

Also when operating in a dark field mode, a measured conjugated quadratures of fields corresponding to a pair of spots comprising a sub-wavelength defect in a locally isotropic section of substrate 60 represents information about the sub-wavelength defect relative to a reference sub-wavelength defect. The reference sub-wavelength defect has properties of the locally isotropic section and dimensions similar to those of the defect. Accordingly, properties measured include information about dimensions and location of the sub-wavelength defect in or on substrate 60.

The accuracy of the interferometric compensation of background fields is high in the first and second embodiments for several reasons. The high accuracy of interferometric compensation is not dependent on the properties of pinholes in pinhole array beam-splitter 112, e.g., the diameter of a pinhole could change by a factor of 2 for example and/or the shape of a pinhole could change from a round aperture to a square aperture and the level of interferometric compensation for associated background fields would not change. The amplitudes and phases of background fields associated with a first spot of a pair of spots are the same as the amplitudes and phases of background fields associated with a second spot of a pair of spots independent of properties of pinholes in pinhole array beam-splitter 112.

The throughputs of the first embodiment can be further increased by the use of a pinhole array beam-splitter that is coupled to input beam 24 by a guided-wave structure such as described in commonly owned U.S. Provisional Patent Application No. 60/445,739 (ZI-39) entitled "Multiple-Source Arrays Fed By Guided Wave Structures And Resonant Structures For Confocal And Near-Field Confocal Microscopy" and U.S. patent application Ser. No. 10,744,250, filed Feb. 6, 2004 (ZI-39) and also entitled "Multiple-Source Arrays Fed By Guided Wave Structures And Resonant Structures For Confocal And Near-Field Confocal Microscopy" both of which are by Henry A. Hill. The contents of the cited U.S. Provisional Patent Application and the U.S. Patent Application are incorporated herein in their entirety by reference.

A second embodiment is configured to measure the optical thickness of thin films on the surface of a substrate. The second embodiment comprises the interferometric confocal imaging system of the first embodiment with a thin film on the surface of substrate 60.

The phase of $V_3(h_1, z_{1,m})$, $\Phi(h_1)$, changes by $2\pi$ as $h_1$ changes from a negative value to a positive value. The rate of change of phase $\Phi(h_1)$ with respect to $h_1$ at $h_1=0$ is related to the optical thickness of the thin film. In particular, the rate of change of phase $\Phi(h_1)$ with respect to $h_1$ at $h_1=0$ decreases as the thickness of the thin film increases. Electronic processor and controller 80 analyzes the arrays of measured conjugated quadratures for the array of rates of change of phase $\Phi(h_1)$ with respect to $h_1$ at $h_1=0$ for information about the thickness profile of the thin film. A film may be detected and its thickness measured for a thickness greater than or of the order of 5 nm.

An important feature of the second embodiment is that the properties of the thin film may be obtained with a lateral spatial resolution substantially equal to a diffraction-limited resolution of an interferometric confocal imaging system operating with a high numerical aperture, e.g., 0.9.

The second embodiment may also be configured to measure the properties of substrate 60 and/or the thin film by the use of different polarization states for reflected/scattered beams from the array of common spots on substrate 60. A polarization state for the reflected/scattered beams is selected by apodizing the pupil of interferometer system 110. The apodization corresponds to dividing the pupil into 4 equal pie sections and blocking the transmission of two diametrically opposite pie sections. The apodization for example permits the restriction of the reflection/scattering to take place substantially as either s or p polarizations. The state of polarization for the reflected/scattered beams is changed by changing the polarization state of input beam 24 and/or rotating the apodizing pie sections about an optical axis of the imaging system.

The use of different states of polarization for reflected/scattered beams represents an important advantage.

The first and second embodiments may also be configured for quad-homodyne detection such as described herein and in cited U.S. Provisional Patent Application No. 60/442,858 (ZI-47) and cited U.S. patent application Ser. No. 10/765,369, filed Jan. 27, 2004 (ZI-47) entitled "Apparatus and Method for Joint Measurements of Conjugated Quadratures of Fields of Reflected/Scattered Beams by an Object in Interferometry" (ZI-47).

Figure 3:
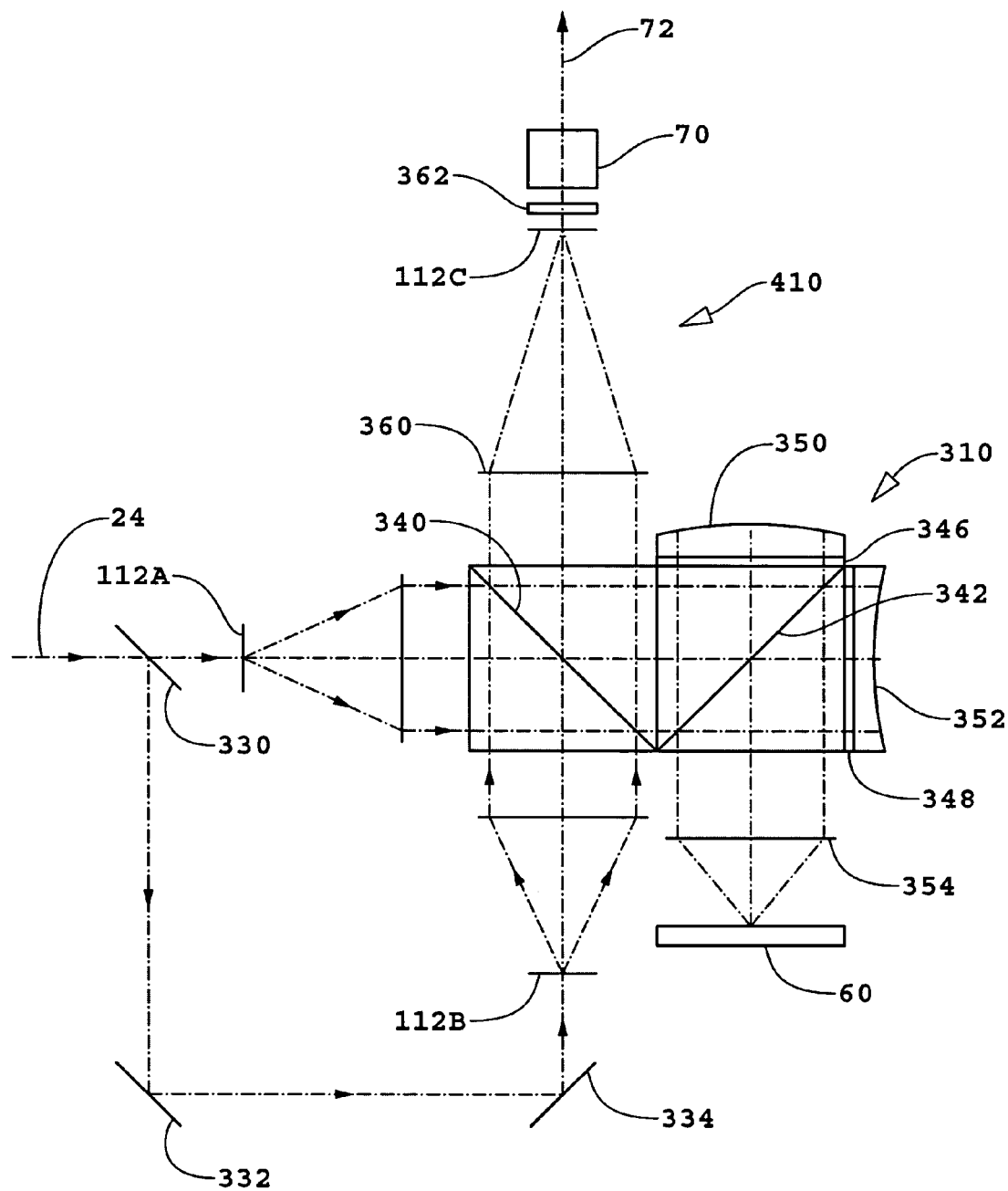
FIG. 3 is a schematic diagram of an interferometric confocal imaging system used to make differential measurements of conjugated quadratures of fields of beams scattered/reflected by a substrate.

A third embodiment is shown schematically in FIG. 3. The third embodiment can be configured to be functionally equivalent to the first and second embodiments. The primary difference between the first and second embodiments and the third embodiment is replacement of the pinhole array beam-splitter 112 with traditional confocal pinhole arrays 112A, 112B, and 112C.

Referring to FIG. 3, input beam 24 is incident on polarizing beam-splitter 330 and a first portion thereof is transmitted as a measurement beam of interferometer 410 and a second portion thereof is reflected as a reference beam of interferometer 410 after reflection by mirrors 332 and 334. The measurement beam and the reference beam are incident on pinhole arrays 112A and 112B, respectively. Pinhole arrays 112A and 112B are each conjugates of pinhole array 112C.

A portion of the reference beam incident on pinhole array 112B is transmitted by beam-splitter 340 and a portion thereof focused by lens 360 to an array of spots on pinhole array 112C.

A portion of the measurement beam incident on pinhole array 112A is transmitted by beam-splitter 340 and first and second portions thereof are focused to arrays of spots on substrate 60. The first portion is focused to a first array of spots after a reflection and transmission by polarizing beam-splitter 342, a double pass through quarter-wave plate 346, reflected by concave mirror 350, and focused by lens 354. The second portion is focused to a second array of spots after a transmission and reflection by polarizing beam-splitter 342, a double pass through quarter-wave plate 348, reflected by convex mirror 352, and focused by lens 354. The description the first and second arrays of spots is the same as description of the corresponding arrays of spots of the first and second embodiments. The relative transverse and longitudinal shifting the first and second arrays of spots is controlled by rotations and longitudinal displacements of concave mirror 350 relative to convex mirror 352. The orientation of optical system 310 which in practice is at an angle of 45 degrees to the plane of FIG. 3 is however shown as oriented in the plane in FIG. 3 in order to simplify the description without limiting the scope or spirit of the present invention.

Portions of the measurement beams that form the first and second arrays of spots are reflected/scattered by substrate 60 as first and second arrays of return measurement beam components, respectively. The first array of return measurement beam components retraces the path of its progenitor array of measurement beam components through imaging system 310 and a portion thereof is focused to an array of spots at pinhole array 112C after reflection by beam-splitter 340. The second array of return measurement beam components retraces the path of its progenitor array of measurement beam components through imaging system 310 and a portion thereof is focused to an array of spots at pinhole array 112C after reflection by beam-splitter 340.

The description of the two arrays of spots at pinhole array 112C is the same as portion of the description given for the corresponding arrays of spots in the first and second embodiments at pinhole array beam-splitter 112 except that the displacements of the spots are not reduced by the factor 1/n. The index of refraction of the medium contiguous to pinhole array 112C is assumed to be 1 although it could be otherwise without departing from the scope and the spirit of the present invention.

Portions of the superimposed array of spots and of the reference beam are transmitted by pinhole array 112C and detected by detector 70 after transmission by analyzer 362 to generate electrical interference signal 72. Analyzer 362 mixes the polarization states of the transmitted portions of the superimposed array of spots and of the reference beam.

The description of input beam 24 is the same as corresponding portions of the description given for input beam 24 of FIG. 1a with beam-conditioner 22 configured as a two-frequency generator and phase-shifter shown in FIG. 1b and beam 20 comprising a single frequency component. Input beam 24 comprises two components that have different frequencies and each component has two components of different states of plane polarization. The relative phases of the components of input beam 24 are shifted between different values according to control signal 74 generated by electronic processor and controller 80 as described in the discussion of beam-conditioner 22.

The remaining portion of the description of the third embodiment is the same as corresponding portions given for the first and second embodiments.

In some embodiments, pinhole array beam-splitter 112 may be scanned in a direction opposite to the direction of scan of substrate 60 and with a speed such that the conjugate images of the pinholes of pinhole array beam-splitter 112 stay superimposed with spots on or in substrate 60 that are being imaged. This scanning mode of operation is analogous to the relative motions of reticle stage and a wafer stage of a lithography tool operating in a scanning mode. The issue of traditional critical alignment of conjugate confocal pinholes in a confocal microscopy system is nonexsistent, i.e. the registration of the pinholes generating the array of reference beams and the pinholes generating the array of measurement beams is automatic.

In certain end use applications, the interior of substrate 60 is imaged. In this case, there will be aberrations introduced. In another embodiment, compensation for aberrations is accomplished by introducing a thin layer (the thin layer has an index of refraction different from lens 150) between lens 150 and pinhole array beam-splitter 112 such as described in commonly owned U.S. Provisional Application No. 60/444, 707(ZI-44) entitled "Compensation of Effects of Mismatch in Indices of Refraction At a Substrate-Medium Interface in Confocal and Interferometric Confocal Microscopy" and U.S. patent application Ser. No. 10/771,785, filed Feb. 4, 2004 (ZI-44) and also entitled "Compensation for Effects of Mismatch in Indices of Refraction at a Substrate-Medium Interface in Confocal and Interferometric Confocal Microscopy" both of which are by Henry A. Hill. The contents of the U.S. Provisional Patent Application and the U.S. Patent Application are incorporated herein in their entirety by reference.

A fourth embodiment comprises the interferometer system of FIGS. 1a–1c with interferometer 10 comprising an interferometric far-field confocal microscope such as described in cited U.S. Pat. No. 5,760,901. In the fourth embodiment, beam-conditioner 22 is configured as the two frequency generator and phase-shifter shown in FIG. 1b. Embodiments in cited U.S. Pat. No. 5,760,901 are configured to operate in either the reflection or transmission mode. The fourth embodiment has reduced effects of background because of background reduction features of cited U.S. Pat. No. 5,760,901.

A fifth embodiment comprises the interferometer system of FIGS. 1a–1c with interferometer 10 comprising an interferometric far-field confocal microscope such as described in cited U.S. Pat. No. 5,760,901 wherein the phase masks are removed. In the fifth embodiment, beam-conditioner 22 is configured as the two frequency generator and phase-shifter shown in FIG. 1b. Embodiments in cited U.S. Pat. No. 5,760,901 are configured to operate in either the reflection or transmission mode. The fifth embodiment with the phase masks of embodiments of cited U.S. Pat. No. 5,760,901 removed represent applications of confocal techniques in a basic form.

A sixth embodiment comprises the interferometer system of FIGS. 1a–1c with interferometer 10 comprising an interferometric far-field confocal microscope such as described in cited U.S. Pat. No. 6,480,285 B1. In the sixth embodiment, beam-conditioner 22 is configured as the two-frequency generator and phase-shifter shown in FIG. 1b. Embodiments in cited U.S. Pat. No. 6,480,285 B1 are configured to operate in either the reflection or transmission mode. The sixth embodiment has reduced effects of background because of background reduction features of cited U.S. Pat. No. 6,480,285 B1.

A seventh embodiment comprises the interferometer system of FIGS. 1a–1c with interferometer 10 comprising an interferometric far-field confocal microscope such as described in cited U.S. Pat. No. 6,480,285 B1 wherein the phase masks are removed. In the fifth embodiment, beam-conditioner 22 is configured as the two-frequency generator and phase-shifter shown in FIG. 1b. Embodiments in cited U.S. Pat. No. 6,480,285 B1 are configured to operate in either the reflection or transmission mode. The seventh embodiment with the phase masks of embodiments of cited U.S. Pat. No. 6,480,285 B1 removed represent applications of confocal techniques in a basic form.

An eighth embodiment comprises the interferometer system of FIGS. 1a–1c with interferometer 10 comprising an interferometric near-field confocal microscope such as described in cited U.S. Pat. No. 6,445,453 (ZI-14). In the eighth embodiment, beam-conditioner 22 is configured as the two-frequency generator and phase-shifter shown in FIG. 1b. Embodiments in cited U.S. Pat. No. 6,445,453 are configured to operate in either the reflection or transmission mode. The eighth embodiment of cited U.S. Pat. No. 6,445,453 in particular is configured to operate in the transmission mode with the measurement beam separated from the reference beam and incident on the substrate being imaged by a non-confocal imaging system, i.e., the measurement beam at the substrate is not an image of an array of pinholes but an extended spot. Accordingly, the corresponding embodiments of the eighth embodiment represent an application of bi-homodyne detection method in a non-confocal configuration for the measurement beam.

Other embodiments may use the quad-homodyne detection method instead of the bi-homodyne detection method as variants of the embodiments. For the embodiments that are based on the apparatus shown in FIGS. 1a–1c, the corresponding variants of the embodiments that use the quad-homodyne detection method use variants of the apparatus shown in FIGS. 1a–1c. In the variants of the apparatus such as used in the first embodiment, microscope 220 is modified to include a dispersive element such as a direct vision prism and/or a dichroic beam-splitter. When configured with a dichroic beam-splitter, a second detector is further added to the system. Descriptions of the variants of the apparatus are the same as corresponding portions of descriptions given for corresponding systems in cited U.S. Provisional Application No. 60/442,982 (ZI-45) and U.S. patent application Ser. No. 10/765,229, filed Jan. 27, 2004 (ZI-45) entitled "Interferometric Confocal Microscopy Incorporating Pinhole Array Beam-Splitter".

Variants of embodiments may be configured to use the double-homodyne detection method for generation of non-joint measurements of conjugated quadratures. Input beam 24 of the variants of the embodiments comprise four frequency components and with the design of the dispersion of a direct vision prism and/or a dichroic beam-splitter such as described with respect to embodiments that are configured to use the quad-homodyne detection method and the selection of the four frequencies such that each of the four frequency components of beam 32 are directed to different pixels of detector 70. Four arrays of electrical interference signal values are obtained simultaneously and processed for amplitudes of conjugated quadratures using the procedure described herein for the single-homodyne detection method.

What is claimed is:

1. An interferometric confocal microscope for measuring an object, said microscope comprising:
   a source-side pinhole array;
   a detector-side pinhole array; and
   an interferometer that images the array of pinholes of the source-side pinhole array onto a first array of spots located in front of an object plane located near where the object is positioned and onto a second array of spots behind the object plane, wherein the first and second arrays of spots are displaced relative to each other in a direction that is normal to the object plane, said interferometer also (1) imaging the first arrays of spots onto a first image plane that is behind the detector-side pinhole array, (2) imaging the first array of spots onto a second image plane, (3) imaging the second array of spots onto the second image plane, and (4) imaging the second array of spots onto a third image plane that is in front of the plane defined by the detector-side pinhole array,
   wherein each spot of the imaged first array of spots in the first image plane is aligned with a corresponding different spot of the imaged second array of spots in the third image plane and a corresponding different pinhole of the detector-side pinhole array, and
   wherein each spot of the imaged first array of spots in the second image plane coincides with a corresponding different spot of the imaged second array of spots in the second image plane and is aligned with a corresponding different pinhole of the detector-side pinhole array.

2. The interferometric confocal microscope of claim 1 wherein the second image plane is between the first and third image planes.

3. The interferometric confocal microscope of claim 1 wherein each spot of the imaged first array of spots in the second image plane is formed by a corresponding beam of a first array of beams and each spot of the imaged second array of spots in the second image plane is formed by a corresponding beam of a second array of beams and wherein the interferometer is configured so that for each spot of the imaged first array of spots, the beam forming that first spot in the second image plane is out of phase by $\pi$ with the beam forming the corresponding spot of the imaged second array of spots in the second image plane.

4. The interferometric confocal microscope of claim 1 wherein the interferometer is configured to operate in a dark field mode.

5. An interferometric confocal microscope for measuring an object, said microscope comprising:
   a source-side pinhole array for producing an array of input beams; and
   a detector-side pinhole array; and
   an interferometer including:
   a first optical element providing a first reflecting surface;
   a second optical element providing a second reflecting surface; and
   a beam splitter positioned between the first and second optical elements,
   wherein the beam splitter produces from the array of input beams a first array of measurement beams and a second array of measurement beams,
   wherein the first reflecting surface participates in focusing the first array of measurement beams onto a first array of locations on a first object plane in object space and the second reflecting surface participates in focusing the second array of measurement beams onto a second array of locations on a second object plane in object space, said first and second object planes being parallel to and displaced from each other,
   wherein the first array of measurement beams generates a first array of return beams from the object and the second array of measurement beams generates a second array of return beams from the object,
   wherein the first and second reflecting elements participate in producing from the first array of return beams (1) a first array of converging beams that converge to a first array of spots on a first image plane and (2) a second array of converging beams that converge onto a second array of spots on a second image plane,
   wherein the first and second reflecting elements participate in producing from the second array of return beams (1) a third array of converging beams that converge onto the second array of spots on the second image plane and (2) a fourth array of converging beams that converge onto a third array of spots on a third image plane, wherein said first and third image planes are adjacent to and on opposite sides of the detector-side pinhole array, and the second image plane lies between the first and third image planes, and wherein the detector-side pinhole array combines the first, second, third, and fourth arrays of converging beams to form an array of output beams.

6. The interferometric confocal microscope of claim 5 wherein a single pinhole array serves as both the source-side pinhole array and the detector-side pinhole array.

7. The interferometric confocal microscope of claim 6, wherein the first optical element is located between said single pinhole array and the beam splitter and wherein the second optical element is located between a location at which the object is positioned during use and the beam splitter, wherein the first reflecting surface has a center of curvature for which there is a corresponding conjugate as viewed through the beam splitter, and wherein the second reflecting surface has a center of curvature that is displaced relative to the corresponding conjugate of the center of curvature of the first reflecting surface.

8. The interferometric confocal microscope of claim 7, wherein the conjugate of the center of curvature of the first reflecting surface and the center of curvature of the second reflecting surface are displaced from each other in a direction that is normal to a plane defined by the beam splitter.

9. The interferometric confocal microscope of claim 8, wherein the first reflecting surface participates in focusing the first array of measurement beams via the beam splitter onto the first array of locations and the second reflecting surface participates in focusing the second array of measurement beams via the beam splitter onto the second array of locations.

10. The interferometric confocal microscope of claim 9 wherein the first reflecting surface is substantially concentric with a point on the object.

11. The interferometric confocal microscope of claim 10, wherein the second optical element provides a refracting surface positioned between the object and the beam splitter to receive light rays from the object.

12. The interferometric confocal microscope of claim 11, wherein the first reflecting surface substantially conforms to a sphere having a first radius and the refracting surface conforms to a sphere having a second radius, wherein the first radius is greater than the second radius.

13. The interferometric confocal microscope of claim 12, wherein the first optical element provides a refracting surface positioned between the beam splitter and said single pinhole array.

14. The interferometric confocal microscope of claim 13 wherein the second reflecting surface is substantially concentric with an image point on said single pinhole array.

15. The interferometric confocal microscope of claim 14, wherein the second reflecting surface substantially conforms to a sphere having a first radius and the refracting surface conforms to a sphere having a second radius, wherein the first radius is greater than the second radius.

16. The interferometric confocal microscope of claim 9, wherein said single pinhole array is a two-dimensional array.

17. The interferometric confocal microscope of claim 16, wherein the two-dimensional array is of equally-spaced holes.

18. The interferometric confocal microscope of claim 17, wherein the equally-spaced holes are circular apertures.

19. The interferometric confocal microscope of claim 5 wherein the interferometer is configured so that for each spot of the first array of spots, the beam forming that spot in the second image plane is out of phase by $\pi$ with the beam forming the corresponding spot of the second array of spots in the second image plane.

20. The interferometric confocal microscope of claim 5 wherein the interferometer is configured to operate in a dark field mode.

* * * * *